(12) United States Patent
Zhang et al.

(10) Patent No.: US 12,022,339 B2
(45) Date of Patent: Jun. 25, 2024

(54) SIGNALING REDUCTION IN CELL GROUP LEVEL CONFIGURATION

(71) Applicant: ZTE Corporation, Guangdong (CN)

(72) Inventors: Mengjie Zhang, Guangdong (CN); Jianxun Ai, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 423 days.

(21) Appl. No.: 17/368,561

(22) Filed: Jul. 6, 2021

(65) Prior Publication Data

US 2021/0345198 A1 Nov. 4, 2021

Related U.S. Application Data

(63) Continuation of application No. PCT/CN2019/070705, filed on Jan. 7, 2019.

(51) Int. Cl.
*H04W 36/00* (2009.01)
*H04W 24/02* (2009.01)
*H04W 36/08* (2009.01)

(52) U.S. Cl.
CPC ....... *H04W 36/0077* (2013.01); *H04W 24/02* (2013.01); *H04W 36/08* (2013.01)

(58) Field of Classification Search
CPC . H04W 37/0077; H04W 37/08; H04W 24/02; Y02D 30/00; Y02D 30/70; H04L 5/001
See application file for complete search history.

(56) References Cited

U.S. PATENT DOCUMENTS

| 2013/0165124 A1 | 6/2013 | Liang et al. |
| 2017/0231011 A1 | 8/2017 | Park et al. |
| 2019/0089502 A1* | 3/2019 | Yi .................. H04W 16/14 |

FOREIGN PATENT DOCUMENTS

| CN | 102378287 A | 3/2012 |
| CN | 102469588 | 5/2012 |
| CN | 107637001 | 1/2018 |

OTHER PUBLICATIONS

European Search Report for EP Patent Application No. 19849727.3, dated Jan. 7, 2022, 14 pages.
3rd Generation Partnership Project, Technical Specification Group Radio Access Network, NR, Radio Resource Control (RRC) protocol specification, Release 15, 3GPP TS 38.331, V15.2.1, Jun. 2018, 303 pages.
Vivo, "CR on new MCS table for 38.331," 3GPP TSG-RAN WG2 NR AH1807, R2-1809884, Montreal, Canada, Jul. 2-6, 2018, 13 pages.

(Continued)

*Primary Examiner* — Jianye Wu
(74) *Attorney, Agent, or Firm* — Perkins Coie LLP

(57) ABSTRACT

Methods, systems, and devices for signaling reduction schemes in a wireless communication are described. A wireless communication method is provided to include signaling, by a network device, a cell configuration information including a first cell configuration for a first cell, a reference configuration information, and a reference identification (ID) for establishing a logical link between the first cell and the reference configuration information, and wherein the signaling is used to configure the first cell based on the first cell configuration for the first cell and the reference configuration information.

19 Claims, 16 Drawing Sheets

(56) References Cited

OTHER PUBLICATIONS

Nokia, et al., "Common SCell configuration," 3GPP TSG-RAN WG2 #100, R2-1713491, Reno, USA, Nov. 27-Dec. 1, 2017, R2-1710999, 6 pages.
Qualcomm Incorporated, "Signalling Optimization for SCell Configuration and Handover," 3GPP TSG-RAN2 Meeting #100, R2-1712257, Reno, USA, Nov. 27 to Dec. 1, 2017, Revision of R2-1710154, 6 pages.
Huawei, et al., "Signalling overhead reduction for SCell Configuration," 3GPP TSG-RAN WG2 Meeting #99, R2-1708548, Berlin, Germany, Aug. 21-25, 2017, 5 pages.
ZTE Corporation, et al., "Signalling overhead reduction for cell configuration and BWP configuration," 3GPP TSG RAN WG2 Meeting #107bis, R2-1913492, Chongqing, China, Oct. 14-18, 2019, Resubmission of R2-1910754, 6 pages.
First office action for CN Patent Application No. 2019800871056, dated Aug. 12, 2022, 47 pages with unofficial translation.
CNIPA, Notification to Complete Formalities of Registration for Chinese Patent Application No. 201980087105.6, dated Feb. 9, 2023, 4 pages with unofficial translation.
International Search Report and Written Opinion dated Sep. 26, 2019 for International Application No. PCT/CN2019/070705, filed on Jan. 7, 2019 (7 pages).
Huawei et al. "Signalling overhead reduction for SCell Configuration" 3GPP TSG-RAN WG2 Meeting #100, R2-1713333, Dec. 1, 2017 (Dec. 1, 2017), 5 pages.
Mediatek Inc. "TP to 38.300 on Cell-Defining SSB" 3GPP TSG RAN WG2 Meeting #101bis, R2-1804610, Apr. 20, 2018 (Apr. 20, 2018), 4 pages.

\* cited by examiner

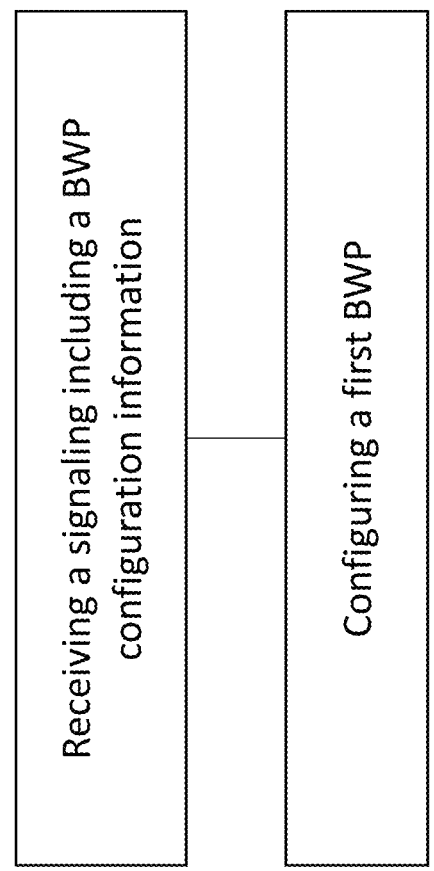

SIGNALING REDUCTION IN CELL GROUP LEVEL CONFIGURATION

CROSS-REFERENCE TO RELATED APPLICATIONS

This application is a continuation of International Patent Application No. PCT/CN2019/070705, filed on Jan. 7, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring robust interference mitigation when using multiple access protocols.

SUMMARY

This document relates to methods, systems, and devices for signaling reduction in wireless communication. The disclosed technology describes methods that can be implemented at a network-side device (such as a base station) and at a user device to reduce signaling overhead.

In one aspect, a wireless communication method is provided to include: signaling, by a network device, a cell configuration information including a first cell configuration for a first cell, a reference configuration information, and a reference identification (ID) for establishing a logical link between the first cell and the reference configuration information, and wherein the signaling is used to configure the first cell based on the first cell configuration for a the first cell and the reference configuration information.

In another aspect, a wireless communication method is provided to include receiving a signaling including a cell configuration information including a first cell configuration for a first cell, a reference configuration information, and a reference identification (ID) for establishing a logical link between the first cell and the reference configuration information; and configuring the first cell based on the first cell configuration for the first cell and the reference configuration information.

In another aspect, a wireless communication method is provided to include signaling, by a network device, a bandwidth part (BWP) configuration information including a first BWP configuration for a first BWP, a reference configuration information, and a reference identification (ID) for establishing a logical link between the first BWP and the reference configuration information, where the signaling is used to configure the first BWP based on the first BWP configuration for the first BWP and the reference configuration information.

In another aspect, a wireless communication method is provided to include receiving a signaling including a BWP configuration information including a first BWP configuration for a first BWP, a reference configuration information, and a reference identification (ID) for establishing a logical link between the first BWP and the reference configuration information; and configuring the first BWP based on the first BWP configuration for the first BWP and the reference configuration information.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIG. 13 shows an example of a signaling reduction scheme in a BWP configuration based on the disclosed technology.

FIG. 14 shows another example of a signaling reduction scheme in a BWP configuration based on the disclosed technology.

DETAILED DESCRIPTION

The disclosed technology provides implementations and examples of signaling reduction schemes in a wireless communication. Some implementations of the disclosed technology provide techniques to reduce the transmission latency and support efficient signaling mechanism, thereby to reduce signaling overhead reduction.

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities. Developing from LTE and LTE Advanced (LTE-A), the 5th generation of wireless system (5G) is required to support higher data-rates, large number of connections, ultra-low latency, high reliability and other emerging business needs.

Dual Connectivity (DC) and Carrier Aggregation (CA) have become two of the widely-used features for boosting data rates in the New Radio (NR) system. With the aid of these two technologies, up to 32 cells can be simultaneously configured to serve for a UE. However, the current DC combined with CA framework is not the most optimum from a delay perspective especially in case of cell/BWP configuration. The delays reduce the efficiency of radio resource and DC/CA usage especially in small cell deployments. In dense small cell deployments, there is substantial signaling overhead for each cell as each of cell needs to be separately configured. Therefore, in order to reduce the transmission latency and support efficient signaling mechanism, solutions to reduce signaling overhead for dense small cell/BWP configuration are needed.

Figure 1:
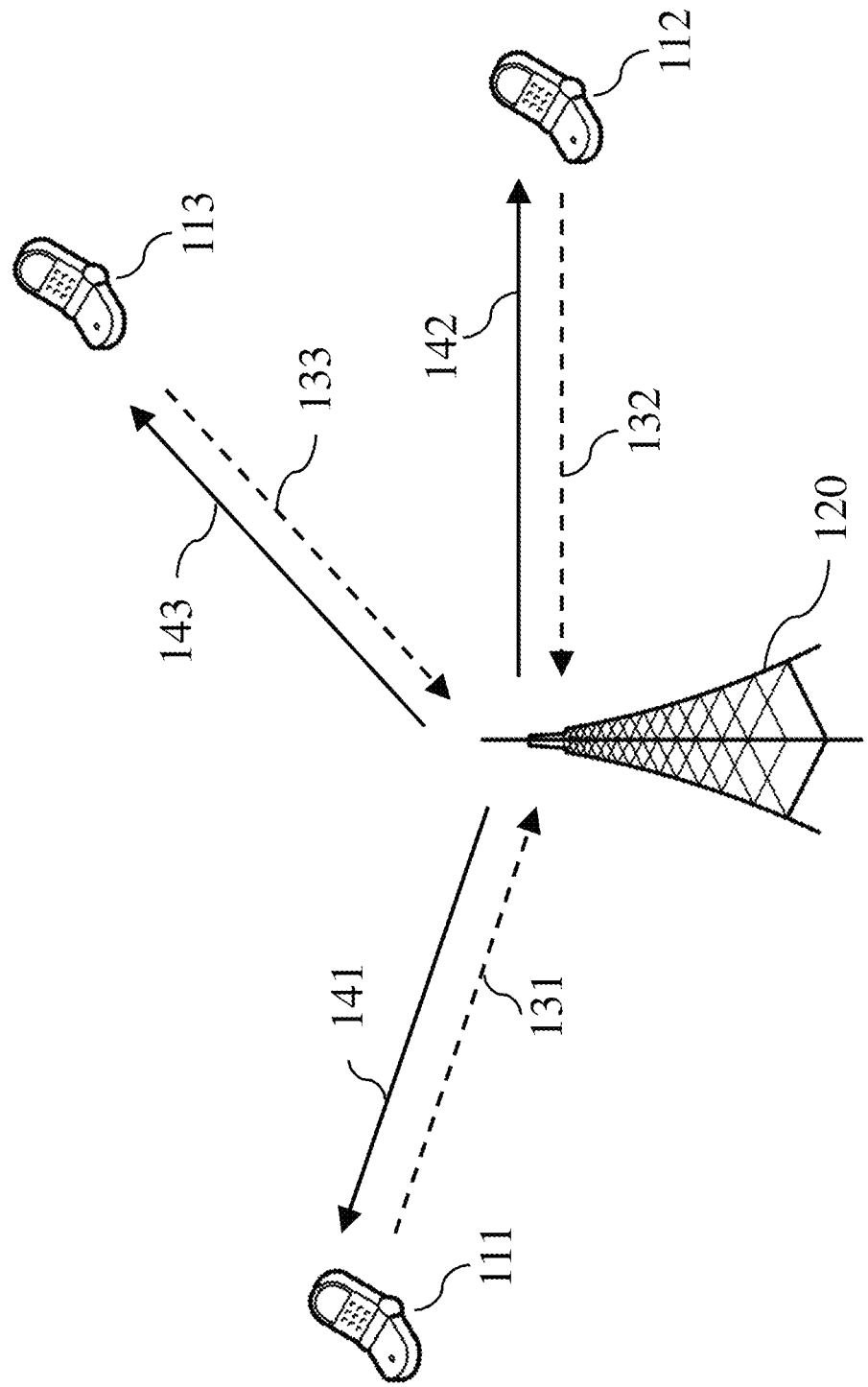
FIG. 1 shows an example of a base station (BS) and user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112 and 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
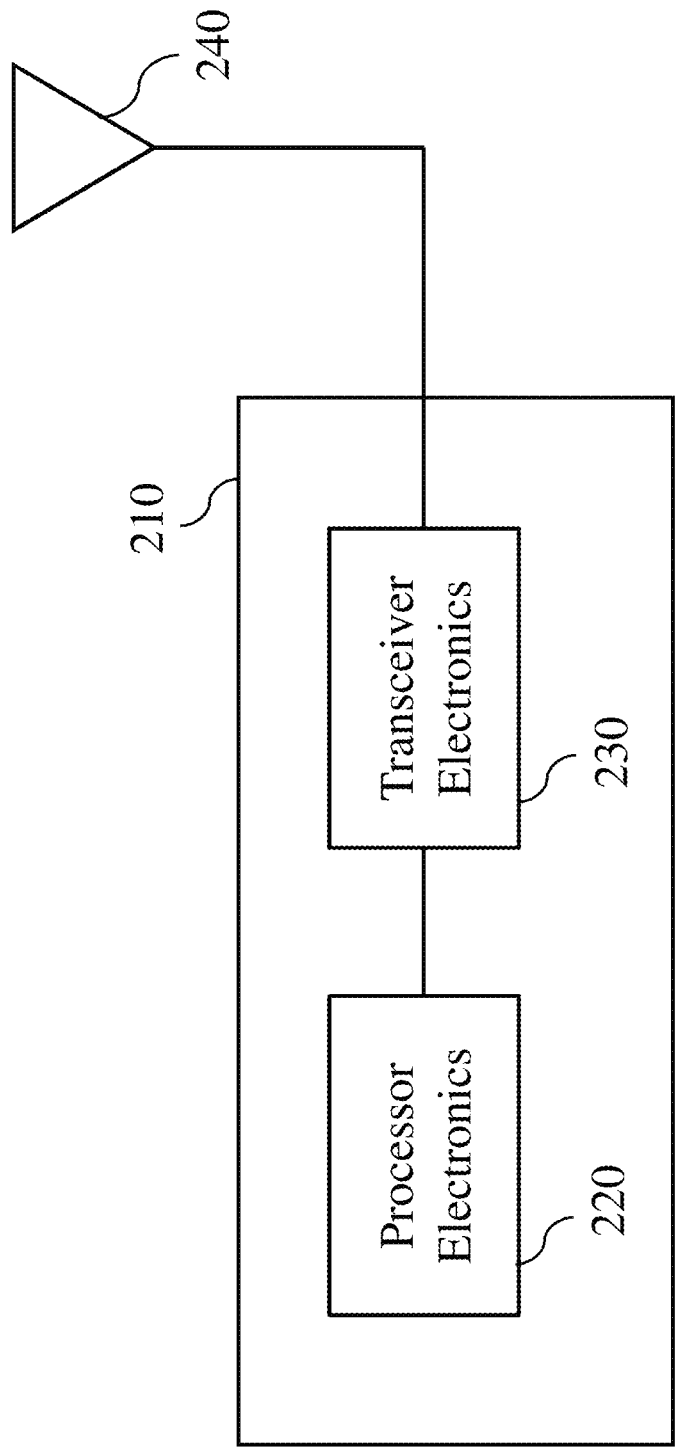
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

Figure 3:
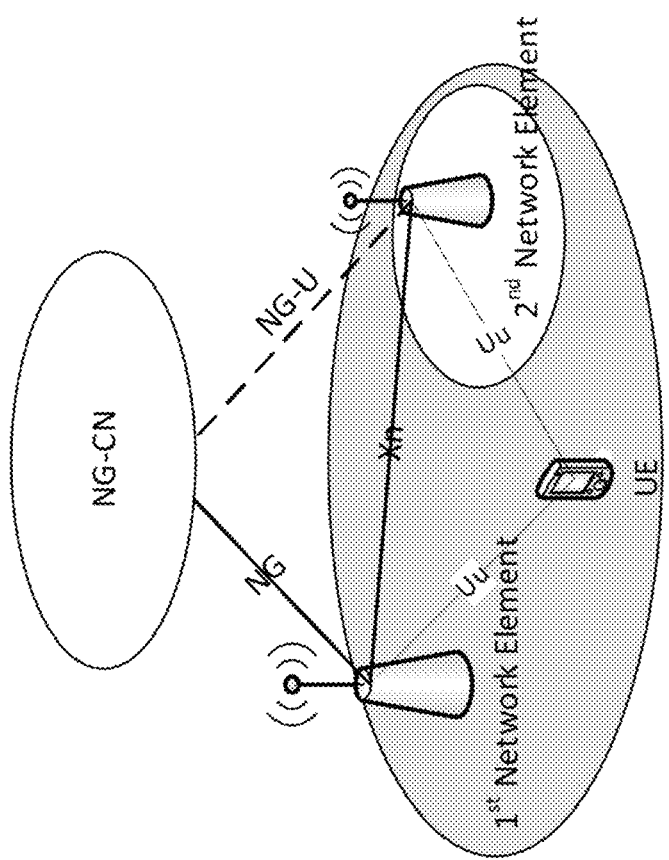
FIG. 3 shows an example of a dual connectivity structure introduced in a NR (New Radio) system.

FIG. 3 shows a dual connectivity structure introduced in a NR (New Radio) system. As shown in FIG. 3, a DC (Dual Connectivity) system may include two (or more) network-side nodes that provide data connectivity to or from UEs. For example, the network nodes may include master and secondary nodes. In another example, the network nodes in a DC system may include an eNB and a gNB or other types of serving network nodes that provide wireless connectivity to UEs. In the DC system, for a UE having multiple transceivers (multiple Rx/Tx), the current serving base station, such as a first network element in FIG. 3, in the NG-RAN may select a suitable wireless channel for the UE. For example, the first network element can select a wireless channel having a quality that meets or exceeds a certain threshold. In the DC system, a second base station, such as a second network element in FIG. 3 can also be added to the UE. In the DC system, the two base stations can jointly provide radio resources for the UE to perform user plane data transmission. Further, in terms of a wired interface, a first NG control plane (NG-C) can be established between the first network element and the Next Generation Core Network (NG-CN), and at most a NG-U can be established between the second network element and the NG-CN for the UE. The first network element and the second network element may be connected by an ideal or non-ideal interface called an Xn interface.

In terms of a wireless interface, the first network element and the second network element may provide the same or different Radio Access Technology (RAT), and relatively independent scheduling of UEs. Among them, the first network element connected to the control plane of the core network can be referred to as a master node, and the core network can have only the user plane connection even if there may be no user plane connection with the core network in some cases. The second network element can be referred to as a secondary node. If there are more than two network elements connected to the UE, all nodes except the master node are called secondary nodes.

Based on the above described dual-connectivity concept, the multi-RAT dual connection refers to a dual connectivity architecture where the master node and the secondary node can be access points of different radio access technologies. For example, one access point can be a NR RAN node (e.g., gNB) and another access point can be an LTE RAN node (eNB). In this example, the eNB and the gNB can be connected to a 5G core network at the same time. In another example, a dual connectivity scenario can include both the primary node and the secondary node as NR RAN nodes (e.g., gNB).

With the similar concept of DC, MC (Multi-Connection) can be achieved if UE's capability reaches the requirement, i.e. UE can simultaneously support more than 2 radio interfaces working. When MC is configured, more than one SNs (Secondary Nodes) can be configured by the MN (Master Node) to serve the UE and provide much more big throughput than the DC structure.

Cell Group Configuration

In the 5G NR system, the network configures the UE with Master Cell Group (MCG), and zero or one Secondary Cell Group (SCG). A cell group comprises one MAC entity, a set of logical channels with associated RLC entities and of a special cell (SpCell) and one or more secondary cells (SCells).

As defined in TS 38.331, for MR-DC system, the CellGroupConfig IE is used to configure a master cell group (MCG) or secondary cell group (SCG). It consists of CellGroupConfig, ReconfigurationWithSync, SCellConfig, and SpCellConfig field. In each cell group, SpCell and SCells are signaled separately since it has been assumed that the configuration of each cell is very different, even if all cells reside in the same gNB. In such case, the RRC structure for cells are added or modified one at a time, and all the serving cell configuration parameters for one cell are separated into their own structures. Therefore, the RRC signaling load for cell configuration is N*(SCellConfig or SpCellConfig), where N is the number of cells. With the increasing of cell number, the total signaling size will increase significantly.

In dual connectivity, the entire cell configurations loaded in MCG or SCG would be transferred between MN and SN via X2 interface, which also increases the X2 signaling load. The configuration for different cells may contain the same content. Once these similar parameters are configured by a cell, they can be sent to the UE using just one copy applied for other cells configurations. Thus, the unnecessary signaling overhead can be significantly reduced by sharing common parameter configurations among different cells. Furthermore, those parameters that are various for each cell can be configured by, for example, a delta signaling.

BWP Configuration

For each serving cell, the network configures at least an initial BWP (Bandwidth Part) comprising at least a downlink BWP and one or two uplink BWP to a UE. Furthermore, the network may configure additional uplink and downlink bandwidth parts for a serving cell. There are up to 4 BWPs (containing both downlink and uplink) configured for a UE. The BWP configuration including common and dedicated parameter configurations is separately configured for uplink and downlink. Except the common parameter set of the initial BWP of the PCell are provided by system information, the BWP configuration parameters for other serving cells are individually configured via dedicated signaling.

As defined in TS 38.331, the IE BWP-Downlink and BWP-uplink are used to configure an additional downlink and uplink BWP (not for the initial BWP), respectively. For each serving cell, the downlink and uplink BWP are signaled separately since it has been assumed that the configuration of each BWP is very different. In such case, the RRC structure for BWPs are added or modified one at a time, and all the BWP configuration parameters for one BWP are separated into their own structures. Therefore, the RRC signaling load for BWP configuration is N*(BWP-Downlink or/and BWP-Downlink), where N is the number of additional BWPs.

However, the configuration for different BWPs may contain some similar contents. Once these similar parameters are configured by one BWP, they can be sent to the UE using just one copy applied for other BWPs configuration whether the BWP belongs to the same serving cell or other serving cells. Thus, the unnecessary signaling overhead can be significantly reduced by sharing the common parameter configurations among different BWPs. Furthermore, those parameters that are various for each BWP can be configured by, for example, the delta signaling.

Figures 4, 5:
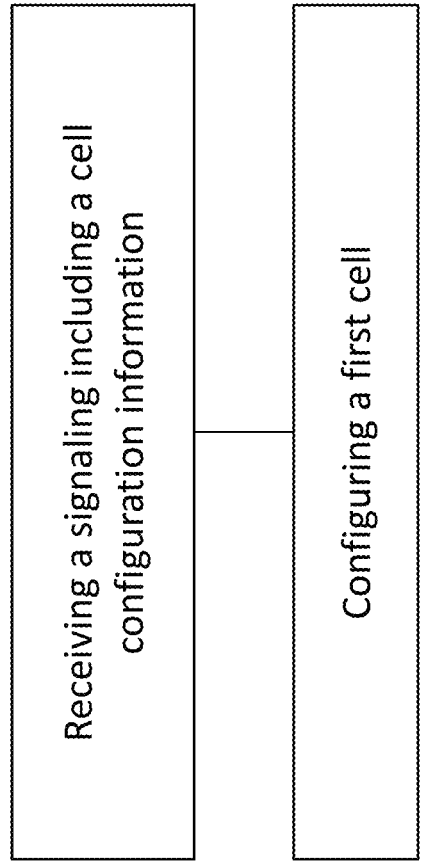
FIG. 4 shows an example of a signaling reduction scheme in a cell configuration based on the disclosed technology.
FIG. 5 shows another example of a signaling reduction scheme in a cell configuration based on the disclosed technology.

Hereinafter, various techniques or solutions to reduce the transmission latency and support efficient signaling mechanism are discussed. Solutions 1 to 3 which are to be discussed below provide examples of overhead reduction schemes in a cell configuration as shown in FIGS. 4 and 5. The method as shown in FIG. 4 includes signaling a first cell configuration for a first cell, a reference configuration information, and a reference identification (ID) for establishing a logical link between the first cell and the reference configuration information. The first cell configuration may include, for example, a delta signaling for Cell_A to provide a configuration part of Cell_A, which is different from that of Cell_B. The signaling is used to configure the first cell based on the first cell configuration and the reference configuration information. FIG. 5 shows another example of a wireless communication method. The method as shown in FIG. 5 includes receiving a signaling including a cell configuration information including a first cell configuration for a first cell, a reference configuration information, and a reference identification (ID) for establishing a logical link between the first cell and the reference configuration information; and configuring a first cell based on the first cell configuration for the first cell and the reference configuration information.

Solution 1: Introducing a Reference ID for Cell Configuration.

Figure 6A:
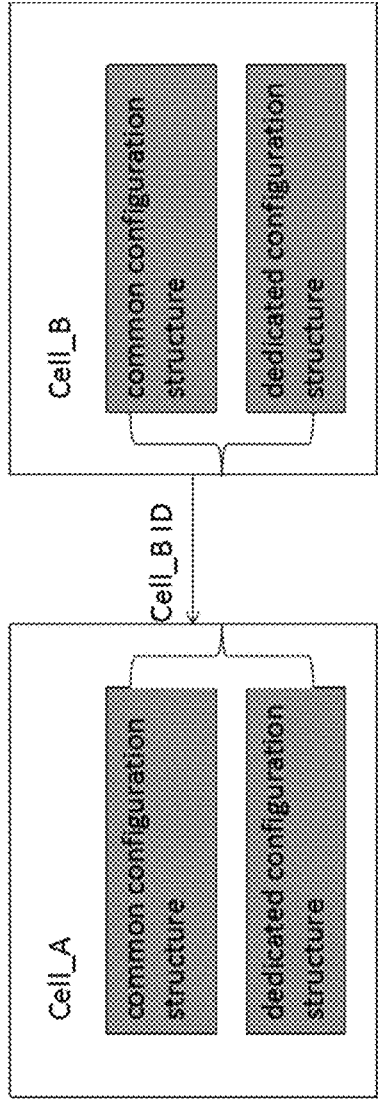
FIGS. 6A and 6B show examples of simplified diagrams to explain a concept of solution 1 suggested in the disclosed technology.
Figure 6B:
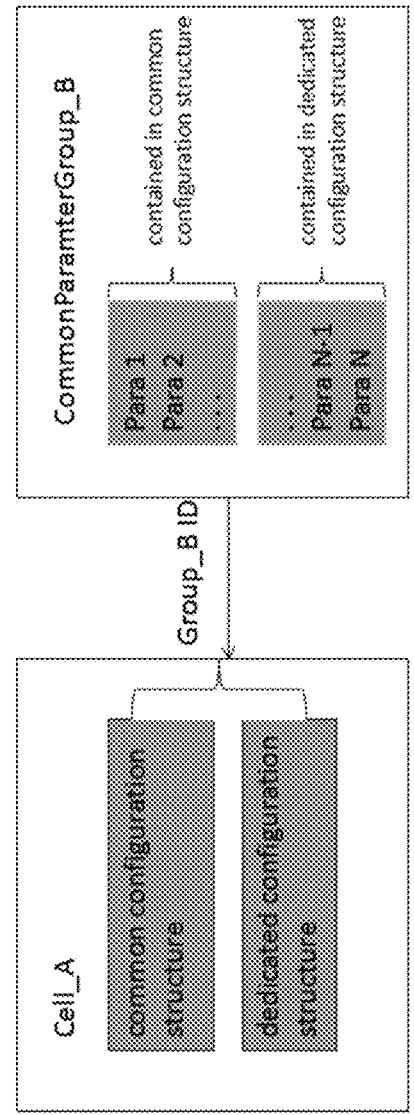

FIGS. 6A and 6B show examples of simplified diagrams to explain a concept of solution 1. In Solution 1, the reference configuration information may include a second cell configuration for a second cell (Cell_B configuration) or a common parameter group. Thus, solution 1 suggests using at least one of the two references for the cell configuration, i) the reference cell configuration (Cell_B configuration) and ii) a common parameter group. FIG. 6A shows the case that the reference configuration information includes Cell_B configuration including its common and dedicated configuration structures and FIG. 6B shows the case that the reference configuration information includes the common parameter group. The common parameter group, which is different form the common configuration structure of a specific cell, may be carried in a network signaling for multiple cells to allow the multiple cells to share the same parameter configuration. The reference ID may include a second cell ID (Cell_B ID) or a common parameter group ID (Group_B ID).

In the below, it is assumed that the signaling includes the reference cell configuration information to configure the first cell (Cell_A) by referring to the second cell (Cell_B). As discussed above, the signaling can be configured to include the common parameter group instead of the reference cell configuration information. To configure the first cell by referring to the common parameter group instead of the reference cell configuration information, it just needs to replace "Cell_B" with "common parameter group" in following description.

Examples of Network Actions

In some implementations, the network side actions may include (1) configuring a Cell_A with the reference configuration information, for example, reference Cell_B ID, which means Cell_A can refer to Cell_B's configuration, and (2) configuring the first cell configuration, for example, the delta signaling for Cell_A, to provide a configuration part of Cell_A which is different from that of Cell_B.

One of ordinary skilled in the art could understand that the disclosed technology is not limited thereto and is carried that the signaling includes the reference configuration information to configure Cell_B with reference to Cell_A ID, which means Cell_A can refer to Cell_B's configuration. In this case, the reference Cell_B may carry several cell indexes.

The reference Cell_B configuration may be stored in the UE or contained in the cell configuration signaling. There are several cases to allow the Cell_A to refer to the reference Cell_B configuration.

Case 1: The Cell_B configuration is stored in the UE, while no Cell_B configuration is carried in the cell configuration signaling. The network shall indicate Cell_A to refer to the local Cell_B configuration by default.

Case 2: The Cell_B configuration is stored in the UE, and the delta configuration for Cell_B is carried in the cell configuration signaling.

For Case 2, the network may (1) indicate Cell_A to refer to the Cell_B configuration after the delta configuration is applied to the local Cell_B configuration; or (2) indicate Cell_A to refer to the local Cell_B configuration; or (3) indicate Cell_A to refer to the Cell_B configuration in the signaling.

In some implementations, an indication is added to the signaling to indicate which Cell_B configuration between the local Cell_B configuration and the Cell_B configuration in the signaling is used as a reference. There are two ways to include indications in the signaling, which include (1) adding an indicator in signaling to indicate which one or both Cell_B configuration is the basis for Cell_A configuration reference; and (2) creating a separate reference to local Cell_B configuration, e.g. index_to_local_Cell_B.

In some implementations, it is captured in the spec that the UE configures Cell_A according to the updated configuration of Cell_B.

Case 3: No Cell_B configuration is stored in the UE, while full configuration for Cell_B is carried in the cell configuration signaling.

For Case 3, the network may indicate Cell_A to refer to the Cell_B configuration carried in the signaling by default.

Since each configured cell could be a reference for other cells, there is a possibility of daisy-chain configuration (e.g. Cell_A refers to Cell_B, Cell_B refers to Cell_C, and Cell_C refers to Cell_A again) to cause cell configuration failure. Thus, the network needs to avoid this situation by setting proper configurations. The single direction chain configuration can be supported for cell reference (e.g. Cell_A refers to Cell_B, Cell_B refers to Cell_C) and reference rules can be defined as follows: (1) Cell_A only refers to Cell_B configuration in the signaling, e.g. before constructing Cell_B configuration by referencing Cell_C configuration, or (2) Cell_A refers to Cell_B configuration after constructing Cell_B configuration by referencing Cell_C configuration.

The rules used for cell configuration may depend on the network implementation.

In some implementations, the reference Cell_B configuration may contain some optional parameters that are not configured for Cell_A. The delta signaling used for cell configuration just contains those parameters configuration that need to be changed or added, but not for parameters release. Thus, for parameters included in Cell_B but not configured for Cell_A, the network shall (a) not use the Cell_B as a reference unless the additional parameters are specified as "Need R" type; or (b) add an reference indicator in the signaling to indicate the UE to release parameter values copied from Cell_B.

Thus, when the network configures Cell_A to refer to Cell_B configuration, the signaling may include (i) Reference Cell_B ID. In some implementations, the signaling may further include (ii) reference indicator indicating which Cell_B configuration is used as the reference basis or (iii) release parameter indicator. The reference indicator may be included in the signaling only when the Cell_B configuration exists in both local and signaling (e.g. ReferenceIndicator ENUMERATED {local, signaling, local+signaling}). If the Cell_B configuration only exists in local or signaling, the indicator field may be absent.

Considering MR-DC case, if the Master Cell Group (MCG) or Secondary Cell Group (SCG) is the NR cell group, the examples of the reference principles are shown as follows:

For each SCell in the NR cell group, other SCell's configuration can be a reference.

For each SCell in the NR cell group, the SpCell's configuration can be a reference.

For the SpCell in the NR cell group, SCell's configuration can be a reference.

Considering NR-DC case, since both MCG and SCG are NR cell group, the additional reference principles can be added on the basis of MR-DC case as follows:

For each SCell in the MCG, SCells and SpCell in the SCG can be a reference.

For each SCell in the SCG, SCells and SpCell in the MCG can be a reference.

For the SpCell in the MCG, SCells and SpCell in the SCG can be a reference.

For the SpCell in the SCG, SCells and SpCell in the MCG can be a reference.

Examples of User Device Actions

When a UE receive the cell configuration signaling for Cell_A with the reference Cell_B ID, the UE may configure the Cell_A by using various processes. In some implementations, the cell configuration signaling for Cell_A may contain a common parameter group ID. In this case, the "Cell_B" in following description can be replaced with "common parameter group."

Figure 7:
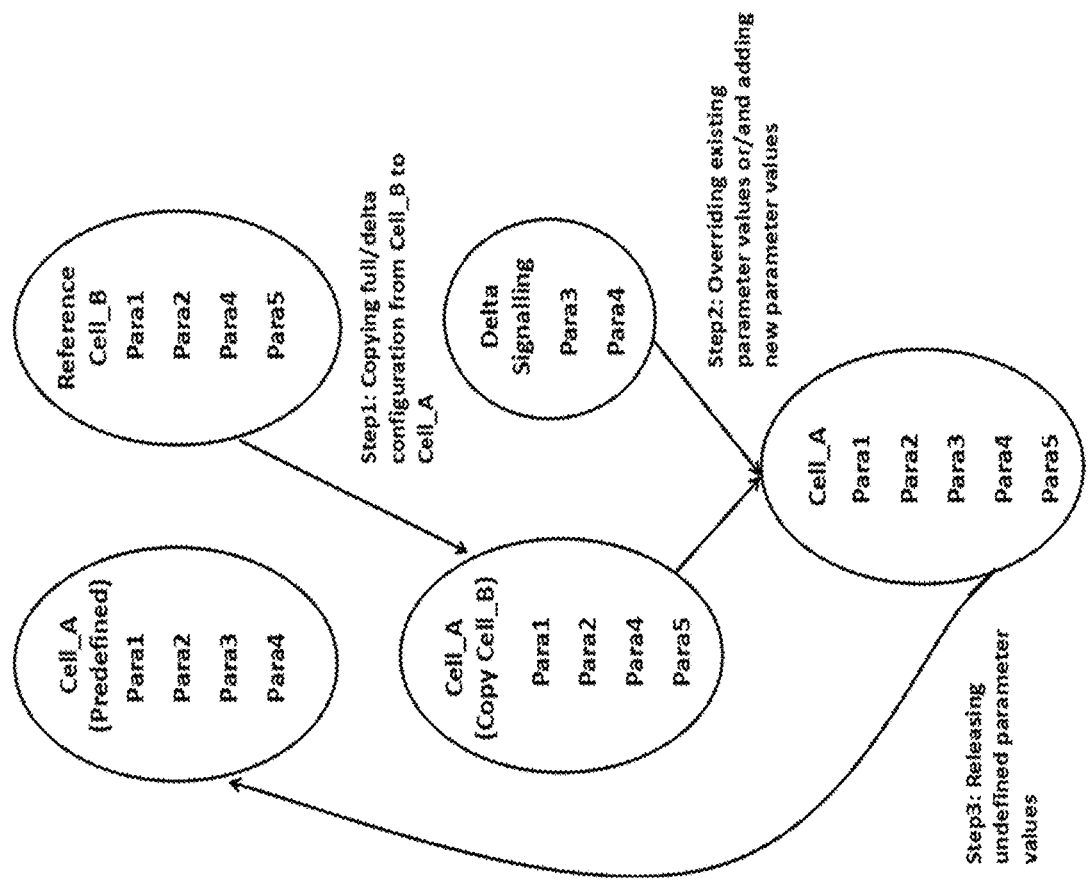
FIG. 7 shows one example of a flowchart showing UE actions as suggested in solution 1 of the disclosed technology.

FIG. 7 shows one example of a flowchart showing UE actions. Referring to FIG. 7, at step 1, the cell configuration information (full or delta configuration) is copied from reference Cell_B to Cell_A. At step 2, according to configurations indicated in the delta signaling, existing Cell_A parameter values are overridden or/and new parameter values are added. At step 3, parameter values which are copied from reference Cell_B but not configured for Cell_A are released according to the indicator in the signaling.

Figure 8:
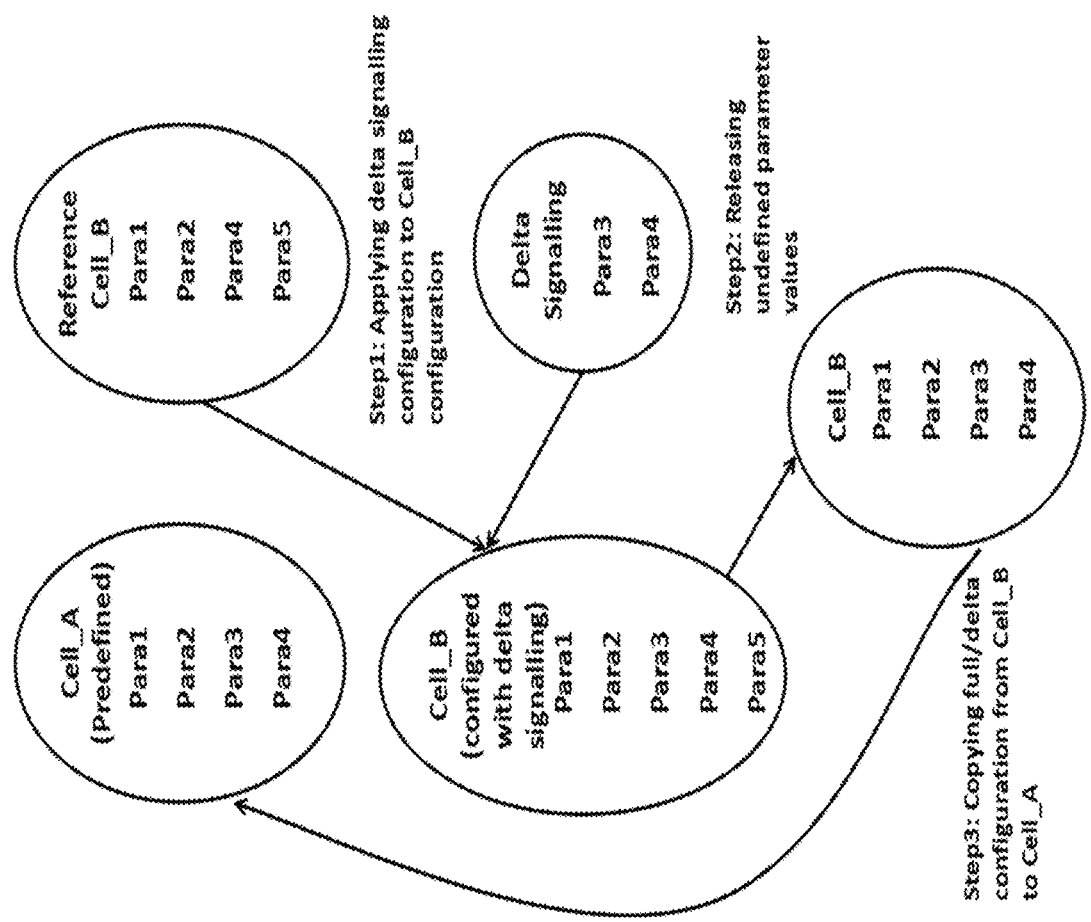
FIG. 8 shows another example of a flowchart showing UE actions as suggested in solution 1 of the disclosed technology.

FIG. 8 shows another example of a flowchart showing UE actions. Referring to FIG. 8, at step 1, the cell configuration information (delta configuration) is applied to Cell B configuration by overriding existing Cell_B parameter values or/and adding new parameter values. At step 2, undefined Cell_A parameter values if they are contained in the Cell_B configuration are released according to the indicator in the signaling. At step 3, the cell configuration information (full or delta configuration) is copied from Cell_B to Cell_A.

The reference Cell_B configuration may be stored in the UE or contained in the cell configuration signaling with Cell_A. There are following cases which describe the UE actions according to the indicator contained in the signaling.

Case 1: If the Cell_B configuration is only carried in the signaling, or the Cell_B configuration is contained in both local and signaling and the indicator is "signaling," the UE may copy the Cell_B configuration carried in the signaling to Cell_A.

Case 2: If the Cell_B configuration is only stored in the local, or the Cell_B configuration is contained in both local and signaling and the indicator is "local," the UE may copy the Cell_B configuration stored in the local to Cell_A.

Case 3: if the Cell_B configuration is contained in both local and signaling and the indicator is "local+signaling," the UE may copy the Cell_B configuration after the Cell_B delta configuration in the signaling is applied to the local Cell_B configuration.

In some implementations, the Cell_B may refer to other cell configuration of another cell, according to the reference rule. In this case, the UE may copy the Cell_B configuration carried in the signaling to Cell_A, and copy the Cell_B configuration after constructing Cell_B configuration by referencing Cell_C configuration.

Except for the common configuration between Cell_A and Cell_B, there are several cases considered for the different configuration part:

Case 1: Cell_A has the parameter, while Cell_B does not have it (e.g. Para3 in FIGS. 4 and 5). In this case, the UE may add the parameter configuration into the current configuration according to the indication in the delta signaling.

Case 2: Cell_A has the parameter, and Cell_B has the same parameter (e.g. Para4 in FIGS. 4 and 5). The UE may override the original configuration by using the configuration indicated in the delta signaling.

Case 3: Cell_A does not have the parameter, but Cell_B has it (e.g. Para5 in FIGS. 4 and 5). The UE may release the parameter configuration.

In the existing ASN.1 (Abstract Syntax Notification One) structure, parameters included in cell configuration signaling may be specified as "OPTIONAL" with different need code type, as shown in Table 1.

TABLE 1

Meaning of abbreviations used to specify the need for fields to be present

| Abbreviation | Meaning |
| --- | --- |
| CondC conditionTag | Configuration condition<br>Presence of the field is conditional to other configuration settings. |
| CondM conditionTag | Message condition<br>Presence of the field is conditional to other fields included in the message. |
| Need S | Specified<br>Used for (configuration) fields, whose field description or procedure specifies the UE behavior performed upon receiving a message with the field absent (and not if field description or procedure specifies the UE behavior when field is not configured). |
| Need M | Maintain<br>Used for (configuration) fields that are stored by the UE i.e. not one-shot. Upon receiving a message with the field absent, the UE maintains the current value. |
| Need N | No action (one-shot configuration that is not maintained) Used for (configuration) fields that are not stored and whose presence causes a one-time action by the UE. Upon receiving message with the field absent, the UE takes no action. |
| Need R | Release<br>Used for (configuration) fields that are stored by the UE i.e. not one-shot. Upon receiving a message with the field absent, the UE releases the current value. |

If a parameter specified as "Need R" type, the UE may release the current value upon receiving a message with the field absent. The delta signaling used for the cell configuration contains the parameter configuration that needs to be changed or added. For those absent fields, it means the values configured are unchanged. So existing values for the absent field need not be released to avoid the configuration mistake.

For the parameter value contained in reference Cell_B but not indicated in the delta signaling, the following cases need to be considered:

Case 1: The parameter is included in the predefined Cell_A configuration but specified as "Need R" type. The UE may take no action for it, just like the parameter specified as "Need N" type. The "predefined Cell_A" means the cell configuration that the network wants to configure for Cell_A. It corresponds to the case that reference Cell_B has the parameter but not configured for Cell_A. If the parameter is directly copied to Cell_A along with other common parameters, this Cell_A configuration is not the same as the configuration originally set by the NW. In this case, the redundant configuration needs to be released.

Case 2: The parameter is included in the predefined Cell_A configuration and not specified as "Need R" type. The UE may take actions as the code specifies.

Case 3: The parameter is not included in the predefined Cell_A configuration but specified as "Need R" type. The UE may release the parameter value.

Case 4: The parameter is not included in the predefined Cell_A configuration and not specified as "Need R" type. The UE may release the parameter value.

When the delta signaling is applied, the UE may take no actions for those parameters specified as "Need R" which is included in the Cell_A configuration but not indicated in the delta signaling.

Based on the above analysis, the detailed actions of the UE in relation to the processes shown in FIG. 7 are as follows:

At step 1, the UE may copy the Cell_B configuration to Cell_A, in accordance with the reference configuration selection process if the received Cell_A configuration signaling contains the reference Cell_B ID. If the received Cell_A configuration signaling does not contain the reference Cell_B ID, the UE directly construct Cell_A by using all parameters configuration indicated in the signaling. The UE takes different actions for various configuration parameters included in the signaling. For a configuration parameter that is contained in the delta signaling for Cell_A configuration, if the parameter is a part of current Cell_A configuration, the current parameter value is overridden as indicated in the delta signaling. If the configuration parameter that is contained in the delta signaling for Cell_A configuration and not the part of the current Cell_A configuration, the new parameter value is added to the current configuration. For a configuration parameter that is included in the release indicator, the current parameter value is released. For a configuration parameter that is specified as "Need R" type, the UE may take no action for the current parameter value. For remaining configuration parameters, the UE may take actions as a code specifies.

The reference configuration selection process is now explained. When the UE receives signaling, it is determined whether the signaling includes a reference Cell_B configuration. If the signaling does not include the reference Cell_B configuration, the UE may copy the local Cell_B configuration to Cell_A. If the received signaling contains the reference Cell_B configuration, it is determined whether the received signaling contains a reference indicator. When the received signaling contains the reference indicator, the UE takes actions depending on the indicator. If the reference indicator shows "signaling," the UE may copy the Cell_B configuration carried in the signaling to Cell_A. If the reference indicator contained in the received signaling shows "local," the UE may copy the local Cell_B configuration to Cell_A. If the reference indicator contained in the received signaling shows "local+signaling," the UE may modify the Cell_B configuration by using the delta configuration indicated in the signaling and copy the updated Cell_B configuration to Cell_A. If the received signaling contains reference Cell_B configuration and the received signaling does not contain the reference indicator, the UE may copy the Cell_B configuration carried in the signaling to Cell_A.

For the processes shown in FIG. 6, the detailed explanations would be omitted. The detailed UE actions may be similar to those discussed for the processes shown in FIG. 4 except for the order of applying of the delta signaling and copying of the reference cell configuration. If the reference Cell_B contains other reference Cell ID (e.g. Cell_C), the UE could refer to the current Cell_B configuration in the signaling. Or the UE could firstly construct Cell_B configuration by referencing Cell_C configuration as described above, then refer to the Cell_B configuration. It depends on the network implementation.

Solution 2: Introducing two reference IDs respectively related to common configuration structure and dedicated configuration structure for cell configuration.

Figure 9:
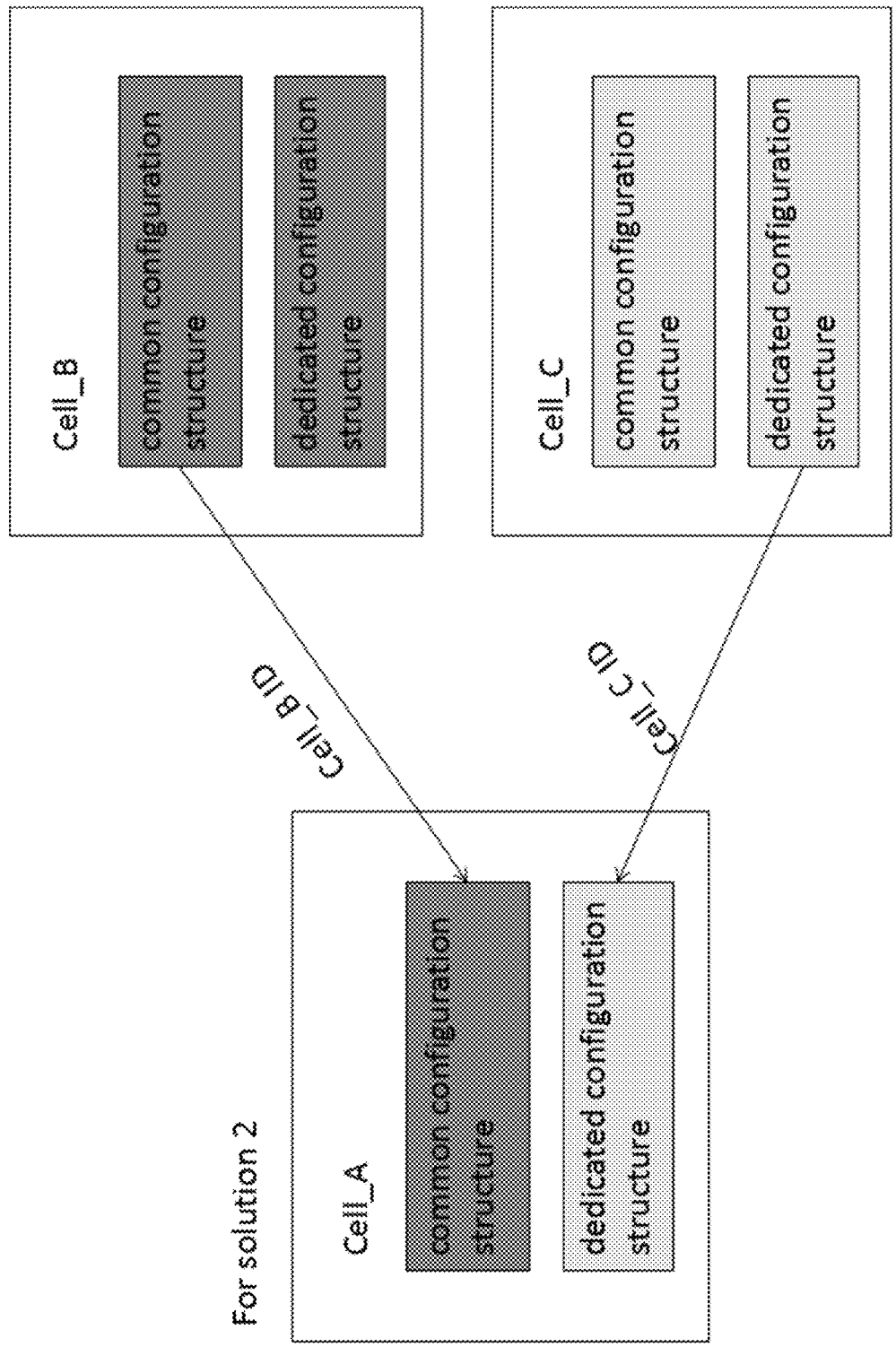
FIG. 9 shows an example of a simplified diagram to explain a concept of solution 2 suggested in the disclosed technology.

FIG. 9 shows an example of a simplified diagram to explain a concept of solution 2. While configuration parameters are divided into two parts, a common configuration structure and a dedicated configuration structure, these two parts can be indicated with different reference Cell IDs to increase the reference flexibility.

Examples of Network Actions

In some implementations, the network side actions may include (1) configuring a Cell_A with the reference configuration information, for example, the reference Cell_B ID and reference Cell_C ID, which means that the common configuration structure for Cell_A may refer to that configured on Cell_B and the dedicated configuration structure for Cell_A may refer to that configured on Cell_C. In some implementations, two reference Cell IDs can indicate the same cell. In that case, there may be just one reference Cell ID for referring to the common configuration structure and the dedicated configuration structure. In some implementations, two reference Cell IDs can indicate the different cells from each other. In some implementations, the network side actions may further include (2) configuring the first cell configuration, for example, the delta signaling for Cell_A to override a part of the Cell_A configuration, thereby configuring the first cell to have a configuration part different from reference cells.

To configure Cell_A to refer to Cell_B and/or Cell_C configuration, the signaling may include the reference Cell_B ID for the common configuration structure and the reference Cell_C ID for the dedicated configuration structure may be included in the signaling. In some implementations, the signaling may further include a reference indicator for which Cell_B configuration is used as the reference basis when the Cell_B configuration exists in both local and signaling, a reference indicator for which Cell_C configuration is used as the reference basis when the Cell_C configuration exists in both local and signaling, or release parameter indicator.

Considering MR-DC case, if the Master Cell Group (MCG) or Secondary Cell Group (SCG) is the NR cell group, the examples of the reference principles are shown as follows:

For each SCell in the NR cell group, its common configuration reference Cell ID can be derived from other SCells or SpCell, and its dedicated configuration reference Cell ID can be derived from other SCells or SpCell. For the SpCell in the NR cell group, its common configuration reference Cell ID can be derived from SCells, and its dedicated configuration reference Cell ID can be derived from SCells.

For each cell in the NR cell group, the dedicated and common configuration reference Cell ID can be derived from the same cell or different cells.

Considering NR-DC case, since both MCG and SCG are NR cell group, the additional reference principles can be added on the basis of MR-DC case as follows:

For each SCell in the MCG, SCells and SpCell in the SCG can be a reference.

For each SCell in the SCG, SCells and SpCell in the MCG can be a reference.

For the SpCell in the MCG, SCells and SpCell in the SCG can be a reference.

For the SpCell in the SCG, SCells and SpCell in the MCG can be a reference.

Examples of User Device Actions

When a UE receive the cell configuration signaling for Cell_A with the reference Cell_B ID or/and Cell_C ID, the UE can configure the Cell_A by using various processes.

Figure 10:
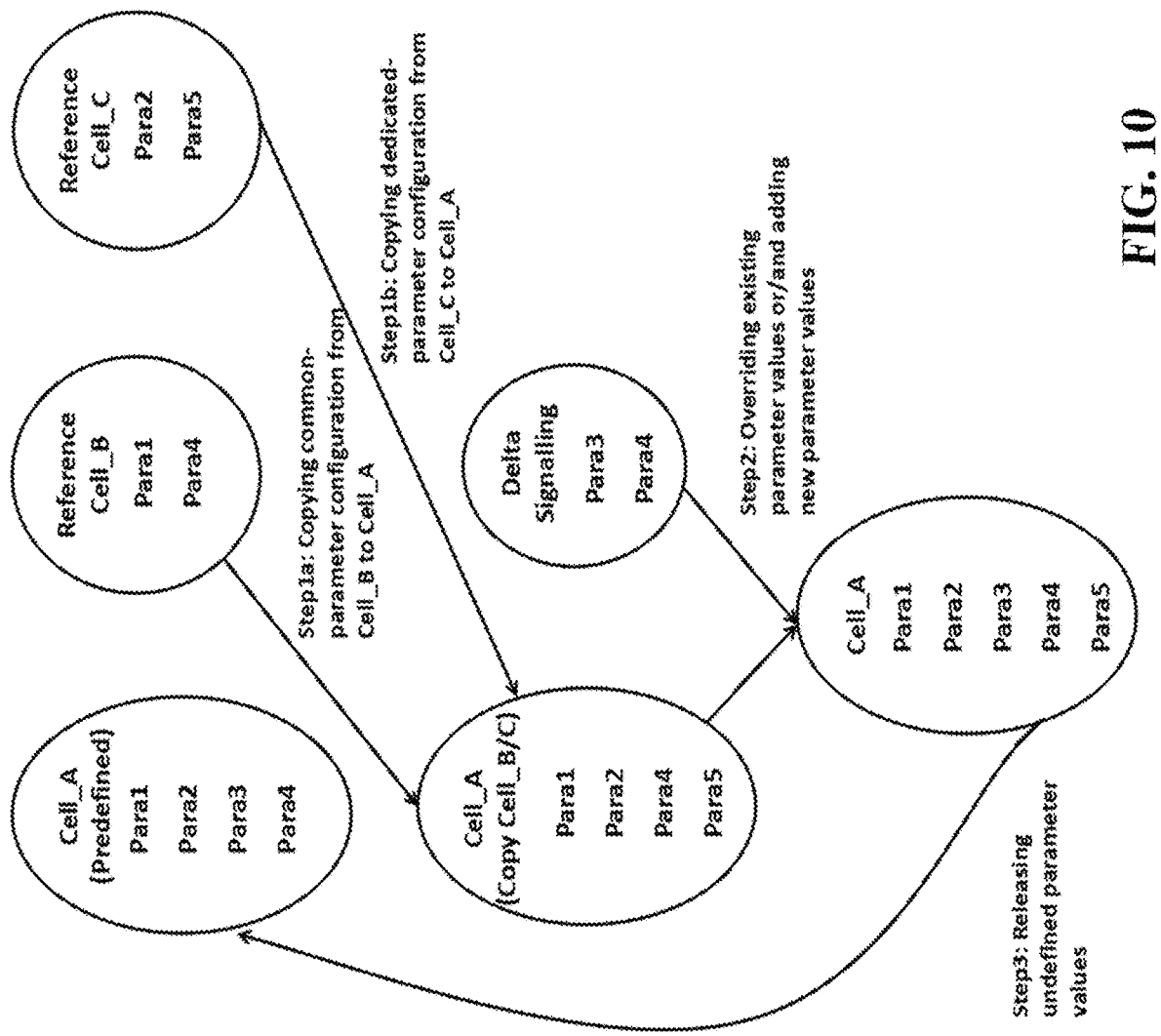
FIG. 10 shows one example of a flowchart showing UE actions as suggested in solution 2 of the disclosed technology.

FIG. 10 shows one example of a flowchart showing UE actions. At step 1*a*, the common configuration structure is copied from reference Cell_B to Cell_A. At step 1*b*, the dedicated configuration structure is copied from reference Cell_C to Cell_A. At step 2, according to configurations indicated in the delta signaling, existing parameter values are overridden or/and new parameter values are added. It is noted that the UE shall take no actions for those parameters specified as "Need R" which is included in the Cell_A configuration but not indicated in the delta signaling. At step 3, parameter values which are copied from reference Cell_B and/or Cell_C but not configured for Cell_A are released.

Figure 11:
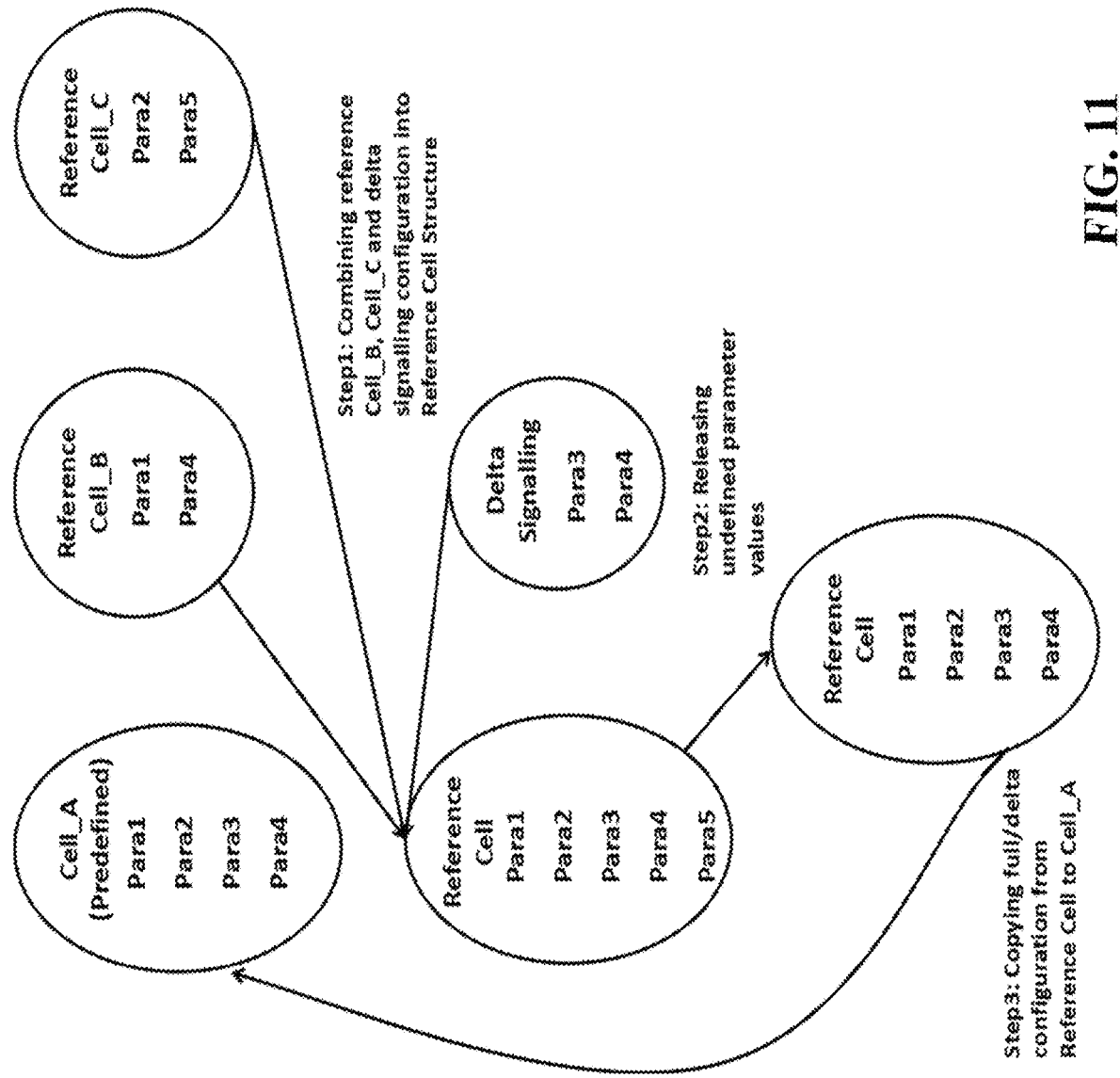
FIG. 11 shows another example of a flowchart showing UE actions as suggested in solution 2 of the disclosed technology.

FIG. 11 shows another example of a flowchart showing UE actions. Referring to FIG. 11, at step 1, the common configuration structure in Cell_B, the dedicated configuration structure in Cell_C, and the delta signaling configuration are combined into the reference cell by overriding existing Cell_B/Cell_C parameter values or/and adding new parameter values according to configuration in delta signaling. In some implementations, only one of Cell_B and Cell_C can be referred to configure Cell_A. In some implementations, both Cell_B and Cell_C can be referred to configure Cell_A. At step 2, undefined parameter values by the indicator in the signaling are released. At step 3, the full/delta configuration is copied from the reference cell to Cell_A.

The detailed analysis of the UE actions is similar to that in Solution 1. When taking the processes shown in FIG. 10 as an example, the detailed actions of the UE are as follows:

At step 1, the common configuration structure is copied from Cell_B to Cell_A in accordance with the reference configuration selection process specified in solution 1; or/and the dedicated configuration structure is copied from Cell_C to Cell_A in accordance with the reference configuration selection process specified in solution 1. The actions at step 1 are performed if the received cell configuration signaling contains the common-parameter reference Cell_B ID; or/and if the received cell configuration signaling contains the dedicated-parameter reference Cell_C ID. If the received cell configuration signaling does not contain any of the Cell_B ID and the Cell_C ID, the UE directly constructs Cell_A by using all parameters configuration indicated in the signaling.

The UE takes different actions for various configuration parameters included in the signaling. For a configuration parameter that is contained in the delta signaling for Cell_A configuration, if the parameter is a part of current Cell_A configuration, the current parameter value is overridden as indicated in the delta signaling. If the configuration parameter that is contained in the delta signaling for Cell_A configuration and not the part of the current Cell_A configuration, the new parameter value is added to the current configuration. For a configuration parameter, that is included in the release indicator, the current parameter value is released. For a configuration parameter that is specified as "Need R" type, the UE may take no action for the current parameter value. For remaining configuration parameters, the UE may take actions as a code specifies.

Solution 3: Introducing a reference ID related to common configuration structure for each cell configuration.

Figure 12:
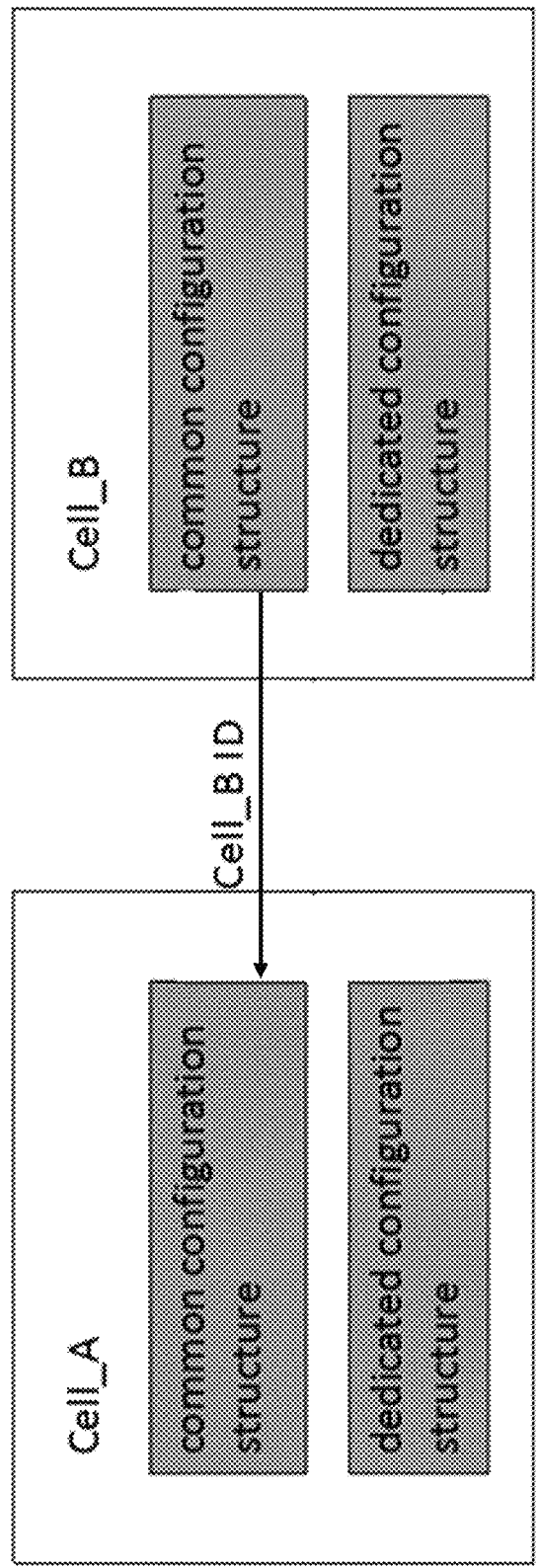
FIG. 12 shows an example of a simplified diagram to explain a concept of solution 3 suggested in the disclosed technology.

In the real network, the common configuration structure of the different cells may be same as one another. Considering that the dedicated configuration structure is the UE specific, the dedicated configuration structure is probably different on different cells. Thus, in solution 3, the network device can configure one reference Cell ID for the delta configuration of the common configuration structure only. Detailed actions may be same as the part of the solution 2, which refers the Cell_B for the common configuration structure of Cell_A. FIG. 12 shows an example of a simplified diagram to explain a concept of solution 3.

Examples of Network Actions

In some implementations, the network side actions may include (1) configuring a Cell_A with the reference Cell_B ID, which means that the common configuration structure for Cell_A may refer to that configured on Cell_B. In some implementations, the network side actions may further include (2) configuring the first cell configuration, for example, the delta signaling for Cell_A to override the common configuration structure for those different parts between Cell_A and reference Cell_B, and add dedicated parameter configuration for Cell_A.

Examples of User Device Actions

When a UE receives the cell configuration signaling for Cell_A with the reference Cell_B ID, the UE can configure the Cell_A by using various processes.

In some implementations, the common configuration structure is copied from the reference Cell_B to Cell_A. Then, according to configurations indicated in the delta signaling, existing parameter values are overridden or/and new parameter values are added. It would be noted that the UE may take no actions for those parameters specified as "Need R" which is included in the Cell_A configuration but not indicated in the delta signaling. Then, parameter values which are copied from reference Cell_B but not configured for Cell_A are released.

In some other implementations, the common configuration structure in Cell_B and the delta signaling configuration are combined into the reference cell by overriding existing Cell_B common configuration structure values or/and adding new parameter values according to configuration in the delta signaling. Then, undefined parameter values are released according to the indicator in the signaling. Then, the delta configuration is copied from reference Cell_B to Cell_A.

In the below, techniques to configure a BWP with reference to reference BWP configuration information are discussed. Solutions 4 to 6 which are to be discussed below provide examples of overhead reduction schemes in a BWP configuration as shown in FIGS. 13 and 14. The method as shown in FIG. 13 includes signaling, by a network device, a BWP configuration information including a first BWP configuration for a first BWP, a reference configuration information, and a reference identification (ID) for establishing a logical link between the first BWP and the reference configuration information; and the signaling is used to configure the first BWP based on the first BWP configuration and the reference configuration information. FIG. 14 shows another example of a wireless communication method. The method as shown in FIG. 14 includes receiving a signaling including a BWP configuration information including a first BWP configuration for a first BWP, a reference configuration information, and a reference identification (ID) for establishing a logical link between the first BWP and the reference configuration information; and configuring the first BWP based on the first BWP configuration and the reference configuration information.

Solution 4: Introducing a reference ID for each BWP configuration.

In this solution, the reference configuration information may include a second BWP configuration for a second BWP (BWP_B configuration) or a common parameter group. Thus, solution 4 suggests using at least one of the two references for BWP configuration, i) the reference BWP configuration (BWP_B configuration) and ii) a common parameter group. The common parameter group, which is different from the common configuration structure of a specific cell, may be carried in a network signaling for multiple BWPs to allow the multiple BWPs to share the same parameter configuration. The reference ID may include a second BWP ID (BWP_B ID) or a common parameter group ID (Group_B ID).

In the below, it is assumed that the signaling includes the reference BWP configuration information to configure the first BWP (BWP_A) by referring to the second BWP (BWP_B). As discussed above, the signaling can be configured to include the common parameter group instead of the reference BWP configuration information. In that case, it just needs to replace "BWP_B" with "common parameter group" in following description.

Examples of Network Actions

In some implementations, the network side actions may include configuring a BWP_A with the reference BWP_B ID, which means that BWP_A can refer to the BWP_B's configuration. Or configuring a BWP_B with BWP_A ID, which means BWP_A can refer to BWP_B's configuration. In this case, the reference BWP_B may carry several BWP indexes. In some implementations, the network side actions may further include configuring the first BWP configuration, for example, the delta signaling for BWP_A to provide a configuration part of the BWP_A which is different from that of BWP_B. In this method, each configured BWP can be a reference for other BWPs. The examples of the reference principles are shown as follows:

(1) For each downlink BWP (except for the initial downlink BWP), other downlink BWP can be a reference.

(2) For each uplink BWP (except for the initial uplink BWP), other uplink BWP can be a reference.

To configure BWP_A with reference to BWP_B, the signaling may include the reference BWP_B ID. In some implementations, the signaling may further include a reference indicator for which BWP_B configuration is used as the reference when the BWP_B configuration exists in both local and signaling, or a release parameter indicator.

Examples of User Device Actions

When a UE receive the BWP configuration signaling for BWP_A with the reference BWP_B ID, the UE may configure the BWP_A by using various processes.

Figure 15:
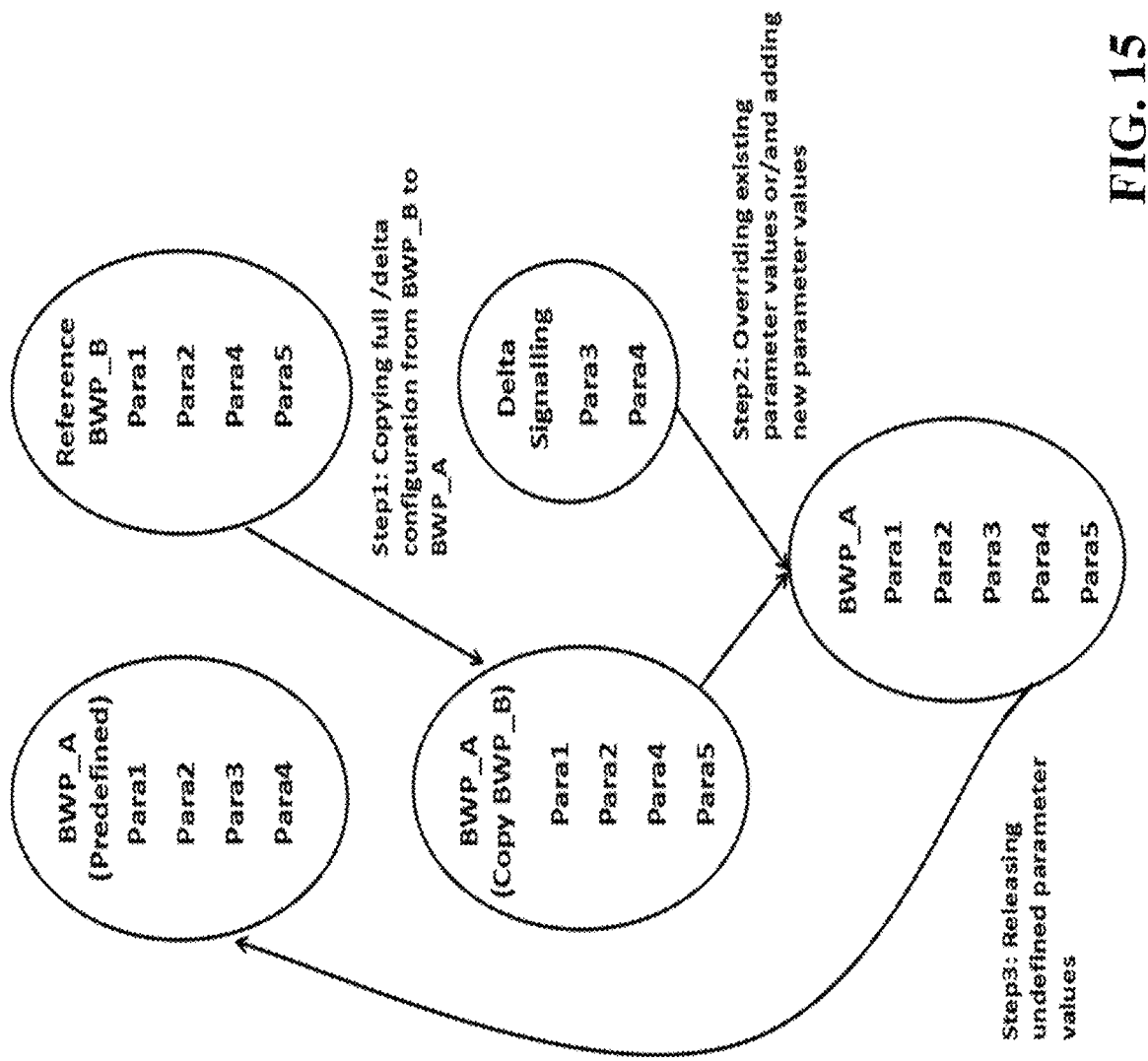
FIG. 15 shows one example of a flowchart showing UE actions as suggested in solution 4 of the disclosed technology.

FIG. 15 shows one example of a flowchart showing UE actions. Referring to FIG. 15, at step 1, the BWP configuration information (full or delta configuration) is copied from the reference BWP_B to BWP_A. At step 2, according to configurations indicated in the delta signaling, existing BWP_A parameter values are overridden or/and new parameter values are added. At step 3, parameter values which are copied from reference BWP_B but not configured for BWP_A are released according to the indicator in the signaling.

Figure 16:
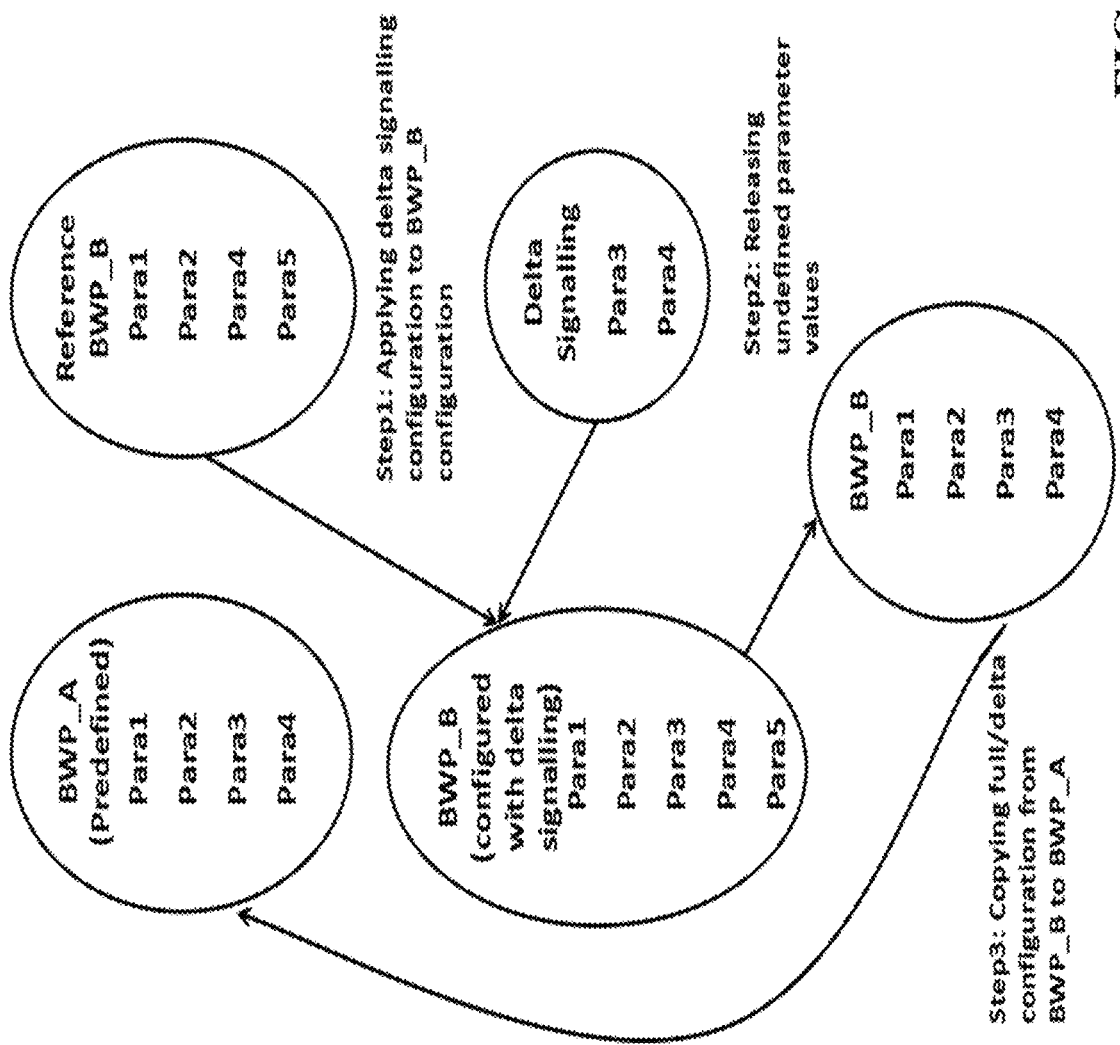
FIG. 16 shows another example of a flowchart showing UE actions as suggested in solution 4 of the disclosed technology.

FIG. 16 shows another example of a flowchart showing UE actions. Referring to FIG. 16, at step 1, the delta signaling configuration is applied to reference BWP_B configuration by overriding existing BWP_B parameter values or/and adding new parameter values. At step 2, undefined BWP_A parameter values that are contained in the BWP_B configuration are released according to the indicator in the signaling. At step 3, the full/delta configuration is copied from BWP_B to BWP_A.

The detailed UE action analysis is similar to that in solution 1. As an example, the detailed UE side action for the processes as shown in FIG. 15 are discussed in the below.

At step 1, the BWP_B configuration is copied to BWP_A, in accordance with the BWP reference configuration selection process if the received BWP_A configuration signaling contains the reference BWP_B ID. If the received BWP_A configuration signaling does not contain the reference BWP_B ID, the UE directly construct BWP_A by using all parameters configuration indicated in the signaling. The UE takes different actions for various configuration parameters included in the signaling. For a configuration parameter that is contained in the delta signaling for BWP_A configuration, if the parameter is a part of current BWP_A configuration, the current parameter is overridden as indicated in the delta signaling. If the configuration parameter that is contained in the delta signaling for BWP_A configuration and not the part of current BWP_A configuration, the new parameter value is added to the current configuration. For a configuration parameter that is included in the release indicator, the current parameter value is released. For a configuration parameter that is specified as "Need R" type, the UE may take no action for the current parameter value. For remaining configuration parameters, the UE may take actions as a code specifies.

The BWP reference configuration selection process is now explained. When the UE receives the signaling, it is determined whether the received signaling contains reference BWP_B configuration. If the signaling does not include the reference BWP_B configuration, the UE may copy the local BWP_B configuration to BWP_A. If the received signaling contains the reference BWP_B configuration, it is determined whether the received signaling contains a reference indicator. When the received signaling contains the reference indicator, the UE takes actions depending on the indicator. If the reference indicator shows "signaling," the UE may copy the BWP_B configuration carried in the signaling to BWP_A. When the reference indicator contained in the received signaling shows "local," the UE may copy the local BWP_B configuration to BWP_A. If the indicator contained in the received signaling shows "local+signaling," the UE may modify the BWP_B configuration by using the delta configuration indicated in the signaling and copy the updated BWP_B configuration to BWP_A. If the received signaling contains reference BWP_B configuration and the received signaling does not contain the reference indicator, the UE may copy the Cell_B configuration carried in the signaling to Cell_A.

Solution 5: Introducing two reference IDs respectively related to common configuration structure and dedicated configuration structure for BWP configuration.

In current BWP configuration structure, configuration parameters are divided into two parts, a common configuration structure and a dedicated configuration structure. These two parts can be indicated with different reference BWP IDs to refer to various BWP configurations.

Examples of Network Actions

In some implementations, the network side actions may include (1) configuring a BWP_A with the reference configuration information, for example, the reference BWP_B ID and reference BWP_C ID, which means that the common configuration structure for BWP_A may refer to that configured on BWP_B and the dedicated configuration structure for BWP_A may refer to that configured on BWP_C. In some implementations, two reference BWP IDs can indicate the same BWP. In some implementations, the network side actions may further include (2) configuring the first BWP configuration, for example, the delta signaling for BWP_A to override a part of the BWP_A configuration, thereby configuring the first BWP to have a configuration part different from reference BWPs.

The examples of the reference principles are shown as follows:

(1) For each downlink BWP (except for the initial downlink BWP), other downlink BWP can be a reference.

(2) For each uplink BWP (except for the initial uplink BWP), other uplink BWP can be a reference.

To configures BWP_A with reference to BWP_B or/and BWP_C configuration, the signaling may include the reference BWP_B ID for the common configuration structure and the reference BWP_C ID for the dedicated configuration structure. In some implementations, the signaling may further include a reference indicator for which BWP_B configuration is used as the reference basis when the BWP_B configuration exists in both local and signaling, a reference indicator for which BWP_C configuration is used as the reference basis when the BWP_C configuration exists in both local and signaling, or release parameter indicator.

Examples of User Device Actions

When a UE receives the BWP configuration signaling for BWP_A with the reference BWP_B ID or/and BWP_C ID, the UE can configure the BWP_A by using various processes.

Figure 17:
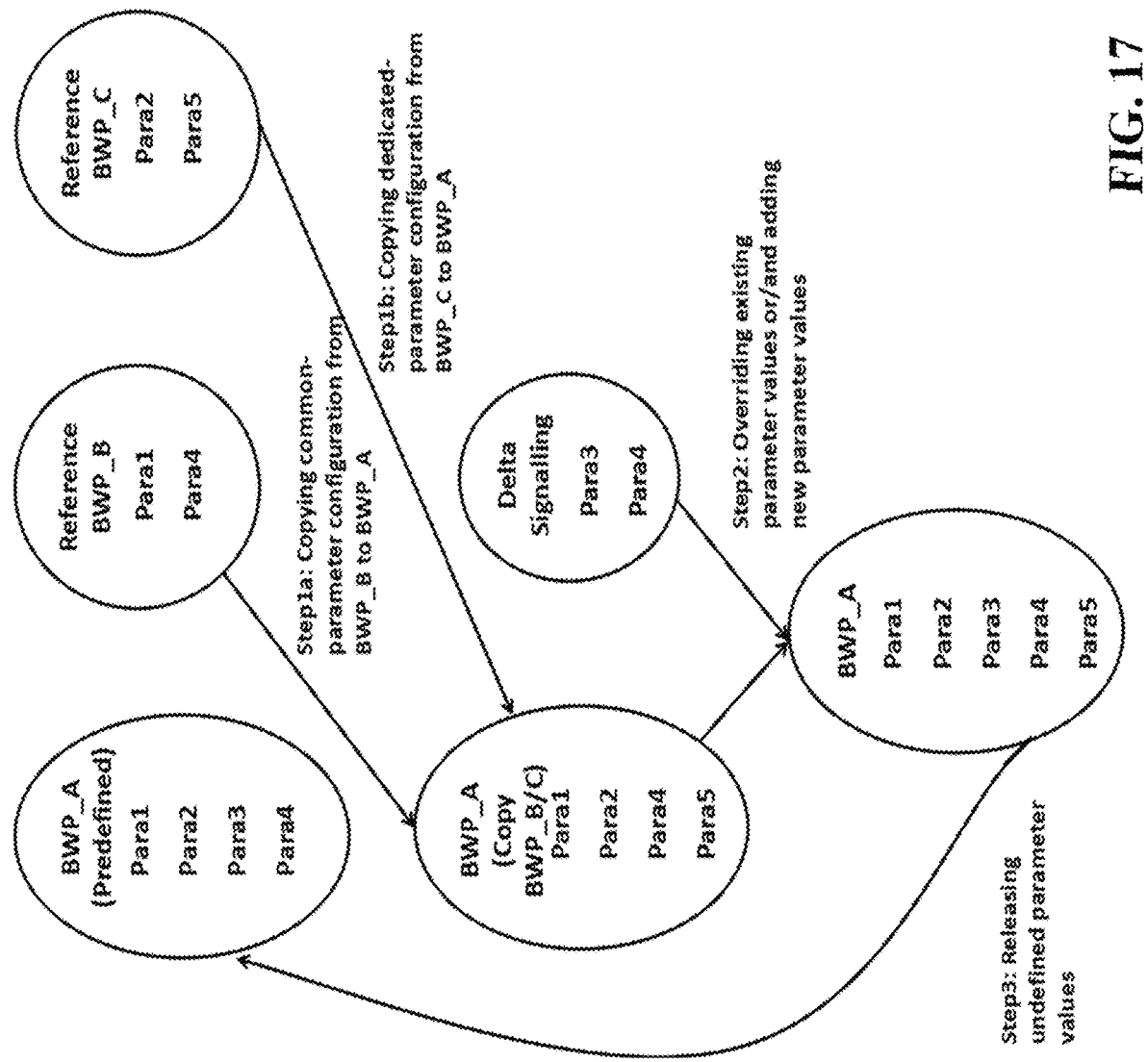
FIG. 17 shows an example of a flowchart showing UE actions as suggested in solution 5 of the disclosed technology.

FIG. 17 shows an example of a flowchart showing UE actions. At step 1a, the common configuration structure is copied from the reference BWP_B to BWP_A. At step 1b, the dedicated configuration structure is copied from reference BWP_C to BWP_A. At step 2, according to configurations indicated in the delta signaling, existing parameter values are overridden or/and new parameter values are added. It is noted that the UE shall take no actions for those parameters specified as "Need R" which is included in the BWP_A configuration but not indicated in the delta signaling. At step 3, parameter values which are copied from reference BWP_B and/or BWP_C but not configured for BWP_A are released.

Figure 18:
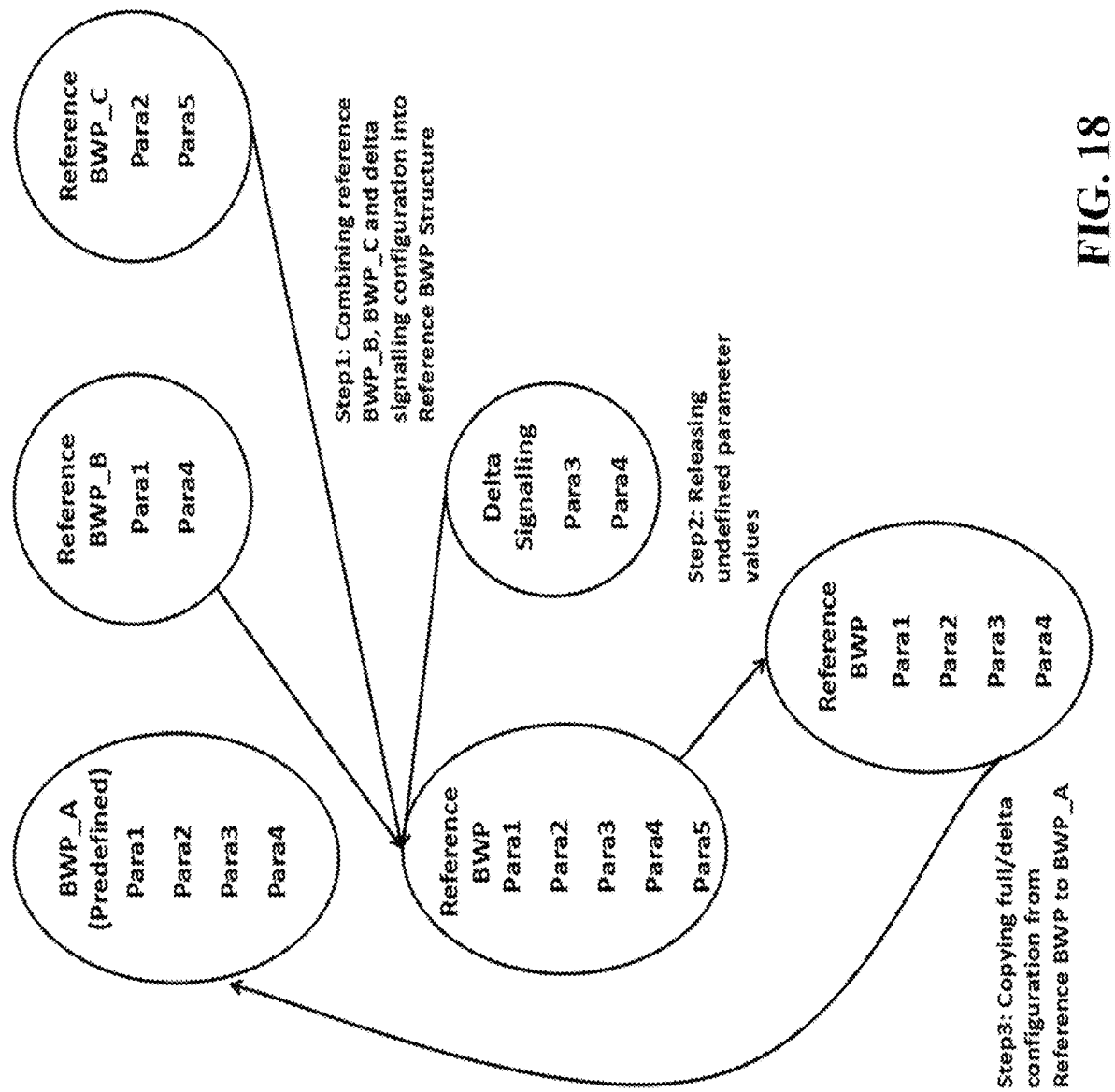
FIG. 18 shows another example of a flowchart showing UE actions as suggested in solution 5 of the disclosed technology.

FIG. 18 shows another example of a flowchart showing UE actions. Referring to FIG. 18, at step 1, the common configuration structure in BWP_B, the dedicated configuration structure in BWP_C, and the delta signaling configuration are combined into the reference cell by overriding existing BWP_B/BWP_C parameter values or/and adding new parameter values according to configuration in delta signaling. In some implementations, only one of BWP_B and BWP_C can be referred to configure BWP_A. In some implementations, both BWP_B and BWP_C can be referred to configure BWP_A. At step 2, undefined parameter values by the indicator in the signaling are released. At step 3, the full/delta configuration is copied from the reference BWP to BWP_A.

The detailed UE action analysis is similar to that in solution 1. When taking the processes shown in FIG. 17 as an example, the detailed actions of the UE are as follows:

At step 1, the common configuration structure is copied from BWP_B to BWP_A in accordance with the reference configuration selection process specified in solution 3; or/and the dedicated configuration structure is copied from BWP_C to BWP_A in accordance with the reference configuration selection process specified in solution 4. The actions at step 1 are performed if the received cell configuration signaling contains the common-parameter reference BWP_B ID; or/and if the received cell configuration signaling contains the dedicated-parameter reference BWP_C ID. If the received cell configuration signaling does not contain any of the BWP_B ID and the BWP_C ID, the UE directly constructs BWP_A by using all parameters configuration indicated in the signaling.

The UE takes different actions for various configuration parameters included in the signaling. For a configuration parameter that is contained in the delta signaling for BWP_A configuration, if the parameter is a part of current BWP_A configuration, the current parameter value is overridden as indicated in the delta signaling. If the configuration parameter that is contained in the delta signaling for BWP_A configuration and not the part of the current BWP_A configuration, the new parameter value is added to the current configuration. For a configuration parameter, that is included in the release indicator, the current parameter value is released. For a configuration parameter that is specified as "Need R" type, the UE may take no action for the current parameter value. For remaining configuration parameters, the UE may take actions as a code specifies.

Solution 6: Introducing a reference ID related to common configuration structure for BWP configuration.

The implementations of Solution 6 are similar to those discussed for the solution 3 and thus, the detailed explanations are omitted.

In the below, examples of specification implementations for Solutions 1 to 6, which are based on the current CellGroupConfig IE structure (for Solutions 1 to 3) and current BWP-Downlink/BWP-Uplink IE structure (for Solutions 4 to 6) in R15, are discussed.

Implementation for Solution 1

For SCell's configuration, one referenceCellConfig IE is directly added to the existing SCell configuration structure SCellConfig IE. For SpCell's configuration, one referenceCellConfig IE is directly added to the existing SpCell configuration structure including SpCellConfig and ReconfigurationWithSync IEs.

The referenceCellConfig IE indicates the reference cell configuration parameters for cell addition or modification. In case provided, each cell utilizes these parameters unless the cell-specific configuration has already signalled the same parameters. It contains referenceCellIndex IE, referenceIndicator IE, and releaseIndicator IE. The referenceCellIndex IE indicates the reference cell ID, including SCellIndex and ServCellIndex. The referenceIndicator IE indicates which reference cell configuration is used as the reference basis, only when the reference cell configuration exists in both local and signaling; if the field is absent, the UE shall use the reference cell configuration only in local or signaling according to actual configuration. The releaseIndicator IE indicates UE to release the current parameter value for the parameter included in the reference cell configuration but not in the defined cell configuration.

The ASN.1 example is provided in Table 2. Table 2 and additional tables as followed below are intended to show examples of how the current version of 3GPP documentation may be modified to describe some embodiments of the disclosed technology. The boldface italicized texts show the changes to the current specification in each Table.

TABLE 2

```
-- ASN1START
-- TAG-CELL-GROUP-CONFIG-START
-- Configuration of one Cell-Group:
CellGroupConfig ::=                    SEQUENCE {
    cellGroupId                        CellGroupId,
    rlc-BearerToAddModList                      SEQUENCE (SIZE(1..maxLC-ID)) OF RLC-
BearerConfig              OPTIONAL, -- Need N
    rlc-BearerToReleaseList                     SEQUENCE (SIZE(1..maxLC-ID)) OF
LogicalChannelIdentity           OPTIONAL, -- Need N
    mac-CellGroupConfig                         MAC-CellGroupConfig
OPTIONAL, -- Need M
    physicalCellGroupConfig                     PhysicalCellGroupConfig
OPTIONAL, -- Need M
    spCellConfig                                SpCellConfig
OPTIONAL, -- Need M
    sCellToAddModList                           SEQUENCE (SIZE (1..maxNrofSCells)) OF
SCellConfig              OPTIONAL, -- Need N
    sCellToReleaseList                          SEQUENCE (SIZE (1..maxNrofSCells)) OF SCellIndex
OPTIONAL, -- Need N
    ...,
    [[
    reportUplinkTxDirectCurrent-v1530           ENUMERATED {true}
OPTIONAL -- Cond BWP-Reconfig
    ]],
    [[
    referenceCellConfig-r16                     ReferenceCellConfig
OPTIONAL -- Need N
    ]]
}
-- Serving cell specific MAC and PHY parameters for a SpCell:
SpCellConfig ::=                       SEQUENCE {
    servCellIndex                      ServCellIndex
OPTIONAL, -- Cond SCG
    reconfigurationWithSync                     ReconfigurationWithSync
OPTIONAL, -- Cond ReconfWithSync
```

TABLE 2-continued

```
rlf-TimersAndConstants            SetupRelease { RLF-TimersAndConstants }
OPTIONAL, -- Need M
    rlmInSyncOutOfSyncThreshold         ENUMERATED {n1}           OPTIONAL,
-- Need S
    spCellConfigDedicated         ServingCellConfig
OPTIONAL, -- Need M
    ...
}
ReconfigurationWithSync ::=       SEQUENCE {
    spCellConfigCommon                ServingCellConfigCommon
OPTIONAL, -- Need M
    newUE-Identity                RNTI-Value,
    t304                          ENUMERATED {ms50, ms100, ms150, ms200, ms500, ms1000,
ms2000, ms10000},
        rach-ConfigDedicated              CHOICE {
            uplink                    RACH-ConfigDedicated,
            supplementaryUplink           RACH-ConfigDedicated
        }                                                          OPTIONAL, -- Need
N
    ...,
    [[
    smtc                SSB-MTC                                     OPTIONAL -
- Need S
    ]],
[[
    referenceCellConfig-r16           ReferenceCellConfig
OPTIONAL -- Need N
]]
}
SCellConfig ::=                   SEQUENCE {
    sCellIndex                        SCellIndex,
    sCellConfigCommon                     ServingCellConfigCommon
OPTIONAL, -- Cond SCellAdd
    sCellConfigDedicated              ServingCellConfig
OPTIONAL, -- Cond SCellAddMod
    ...,
    [[
    smtc                SSB-MTC                                     OPTIONAL -
- Need S
        ]],
    [[
    referenceCellConfig-r16           ReferenceCellConfig
OPTIONAL -- Need N
        ]]
}
ReferenceCellConfig ::=           SEQUENCE {
    referenceCellIndex                ENUMERATED {SCellIndex, ServCellIndex}
OPTIONAL -- Need R
    referenceIndicator            ENUMERATED {local, signalling, local+Signalling}
OPTIONAL -- Need S
    releaseIndicator              ENUMERATED {para1, para2, ...}
OPTIONAL -- Need R
}
-- TAG-CELL-GROUP-CONFIG-STOP
-- ASN1STOP
```

Implementation for Solution 2

Based on the current CellGroupConfig IE structure in R15, the specific implementations are shown as follows:

For SCell's configuration, one referenceCellConfig IE is directly added to the existing SCell configuration structure SCellConfig IE. For SpCell's configuration, one referenceCellConfig IE is directly added to the existing SpCell configuration structure including SpCellConfig and ReconfigurationWithSync IEs.

The referenceCellConfig IE indicates the reference cell configuration parameters for cell addition or modification. In the case provided, each cell utilizes these parameters unless the cell-specific configuration has already signalled the same parameters.

The referenceCellConfig IE contains cellConfigCommonIndex IE, cellConfigDedicatedIndex IE, referenceIndicator IE, and releaseIndicator IE. The cellConfigCommonIndex IE and cellConfigDedicatedIndex IE indicate the common-parameter reference cell ID and dedicated-parameter reference cell ID, respectively. Each one includes SCellIndex and ServCellIndex. The referenceCommonIndicator IE and referenceDedicatedIndicator IE indicate which reference cell configuration is used as the reference basis, only when the reference cell configuration exists in both local and signaling; if the field is absent, the UE shall use the reference cell configuration only in local or signaling according to actual configuration. The releaseIndicator IE indicates UE to release the current parameter value for the parameter included in the reference cell configuration but not in the defined cell configuration.

The ASN.1 example is provided in Table 3 (the modification is in boldface italic):

TABLE 3

```
-- ASN1START
-- TAG-CELL-GROUP-CONFIG-START
-- Configuration of one Cell-Group:
CellGroupConfig ::=                     SEQUENCE {
    cellGroupId                         CellGroupId,
    rlc-BearerToAddModList                      SEQUENCE (SIZE(1..maxLC-ID)) OF RLC-
BearerConfig            OPTIONAL, -- Need N
    rlc-BearerToReleaseList                     SEQUENCE (SIZE(1..maxLC-ID)) OF
LogicalChannelIdentity          OPTIONAL, -- Need N
    mac-CellGroupConfig                 MAC-CellGroupConfig
OPTIONAL, -- Need M
    physicalCellGroupConfig             PhysicalCellGroupConfig
OPTIONAL, -- Need M
    spCellConfig            SpCellConfig                    OPTIONAL,
-- Need M
    sCellToAddModList               SEQUENCE (SIZE (1..maxNrofSCells)) OF
SCellConfig             OPTIONAL, -- Need N
    sCellToReleaseList              SEQUENCE (SIZE (1..maxNrofSCells)) OF SCellIndex
OPTIONAL, -- Need N
    ...,
    [[
    reportUplinkTxDirectCurrent-v1530               ENUMERATED {true}
OPTIONAL -- Cond BWP-Reconfig
    ]]
}
-- Serving cell specific MAC and PHY parameters for a SpCell:
SpCellConfig ::=                SEQUENCE {
    servCellIndex           ServCellIndex
OPTIONAL, -- Cond SCG
    reconfigurationWithSync                 ReconfigurationWithSync
OPTIONAL, -- Cond ReconfWithSync
    rlf-TimersAndConstants              SetupRelease { RLF-TimersAndConstants }
OPTIONAL, -- Need M
    rlmInSyncOutOfSyncThreshold                 ENUMERATED {n1}         OPTIONAL,
-- Need S
    spCellConfigDedicated           ServingCellConfig
OPTIONAL, -- Need M
    ...,
[[
    referenceCellConfig-r16             ReferenceCellConfig
OPTIONAL -- Need N
]]
}
ReconfigurationWithSync ::=              SEQUENCE {
    spCellConfigCommon              ServingCellConfigCommon
OPTIONAL, -- Need M
    newUE-Identity          RNTI-Value,
    t304                ENUMERATED {ms50, ms100, ms150, ms200, ms500, ms1000,
ms2000, ms10000},
        rach-ConfigDedicated                CHOICE {
        uplink              RACH-ConfigDedicated,
        supplementaryUplink             RACH-ConfigDedicated
    }                               OPTIONAL, -- Need
N
    ...,
    [[
    smtc        SSB-MTC                         OPTIONAL -
- Need S
]],
[[
    referenceCellConfig-r16             ReferenceCellConfig
OPTIONAL -- Need N
]]
}
SCellConfig ::=                 SEQUENCE {
    sCellIndex              SCellIndex,
    sCellConfigCommon                   ServingCellConfigCommon
OPTIONAL, -- Cond SCellAdd
    sCellConfigDedicated            ServingCellConfig
OPTIONAL, -- Cond SCellAddMod
    ...,
    [[
    smtc                    SSB-MTC                         OPTIONAL -
- Need S
]],
[[
    referenceCellConfig-r16             ReferenceCellConfig
OPTIONAL -- Need N
]]
}
```

TABLE 3-continued

```
ReferenceCellConfig ::=         SEQUENCE {
CellConfigCommonIndex               ENUMERATED {SCellIndex,ServCellIndex}
OPTIONAL -- Need R
CellConfigDedicatedIndex             ENUMERATED {SCellIndex,ServCellIndex}
OPTIONAL -- Need R
referenceCommonIndicator             ENUMERATED {local, signalling, local+Signalling}
OPTIONAL -- Need S
referenceDedicatedIndicator          ENUMERATED {local, signalling, local+Signalling}
OPTIONAL -- Need S
releaseIndicator        ENUMERATED {para1, para2, ...}
OPTIONAL -- Need R
}
-- TAG-CELL-GROUP-CONFIG-STOP
-- ASN1STOP
```

Implementation for Solution 3

The ASN.1 example is similar with that for Solution 1.

Implementation for Solution 4

Based on the current BWP-Uplink IE or BWP-Downlink IE structure in R15, the specific implementations are shown as follows:

One referenceBWPConfig IE is directly added to the existing BWP configuration structure: BWP-Uplink IE and BWP-Downlink IE. The referenceBWPConfig IE contains the BWP-Id IE.

The referenceBWPConfig IE indicates the reference BWP configuration parameters for BWP addition or modification. In case provided, each BWP utilizes these parameters unless the bwp-specific configuration has already signalled the same parameters.

It contains referenceBWPIndex IE, referenceIndicator IE, and releaseIndicator IE. The referenceBWPIndex IE indicates the reference BWP ID. The referenceIndicator IE indicates which reference BWP configuration is used as the reference basis, only when the reference BWP configuration exists in both local and signalling; if the field is absent, the UE shall use the reference BWP configuration only in local or signalling according to actual configuration. The releaseIndicator IE indicates UE to release the current parameter value for the parameter included in the reference BWP configuration but not in the defined BWP configuration.

The ASN.1 example is provided in Tables 4 and 5 (the modification is in boldface italic):

TABLE 4

BWP-Downlink information element

```
-- ASN1START
-- TAG-BWP-DOWNLINK-START
BWP-Downlink ::=        SEQUENCE {
    bwp-Id          BWP-Id,
    bwp-Common              BWP-DownlinkCommon
OPTIONAL, -- Cond SetupOtherBWP
    bwp-Dedicated           BWP-DownlinkDedicated
OPTIONAL, -- Need M
    ...,
    [[
    referenceBWPConfig-r16          ReferenceBWPConfig
OPTIONAL -- Need N
    ]]
}
ReferenceBWPConfig ::=          SEQUENCE {
    referenceBWPIndex           BWP-ID OPTIONAL -- Need R
    referenceIndicator      ENUMERATED {local, signalling, local+Signalling}
OPTIONAL -- Need S
    releaseIndicator        ENUMERATED {para1, para2, ...}
OPTIONAL -- Need R
}
-- TAG-BWP-DOWNLINK-STOP
-- ASN1STOP
```

TABLE 5

BWP-Uplink information element

```
-- ASN1START
-- TAG-BWP-UPLINK-START
BWP-Uplink ::=      SEQUENCE {
    bwp-Id          BWP-Id,
    bwp-Common              BWP-UplinkCommon
OPTIONAL, -- Cond SetupOtherBWP
    bwp-Dedicated           BWP-UplinkDedicated
```

TABLE 5-continued

BWP-Uplink information element

```
OPTIONAL, -- Need M
   ...,
   [[
   referenceBWPConfig-r16          ReferenceBWPConfig
OPTIONAL -- Need N
]]
}
ReferenceBWPConfig ::=         SEQUENCE {
referenceBWPIndex      BWP-ID          OPTIONAL -- Need R
referenceIndicator          ENUMERATED {local, signalling, local+Signalling}
OPTIONAL -- Need S
releaseIndicator            ENUMERATED {para1, para2, ...}
OPTIONAL -- Need R
}
-- TAG-BWP-UPLINK-STOP
-- ASN1STOP
```

Implementations for Solution 5

Based on the current BWP-Uplink IE or BWP-Downlink IE structure in R15, the specific implementations are shown as follows:

One referenceBWPConfig IE is directly added to the existing BWP configuration structure: BWP-uplink IE and BWP-downlink IE. The referenceCellConfig IE indicates the reference cell configuration parameters for cell addition or modification. In case provided, each cell utilizes these parameters unless the cell-specific configuration has already signalled the same parameters.

The referenceBWPConfig IE contains BWPConfigCommonIndex IE, BWPConfigDedicatedIndex IE, referenceIndicator IE, and releaseIndicator IE. The BWPConfigCommonIndex IE and BWPConfigDedicatedIndex IE indicate the common-parameter reference BWP ID and dedicated-parameter reference BWP ID, respectively. The referenceCommonIndicator IE and referenceDedicatedIndicator IE indicate which reference BWP configuration is used as the reference basis, only when the reference BWP configuration exists in both local and signalling; if the field is absent, the UE shall use the reference BWP configuration only in local or signalling according to actual configuration. The releaseIndicator IE indicates UE to release the current parameter value for the parameter included in the reference BWP configuration but not in the defined BWP configuration.

The ASN.1 example is provided in Tables 6 and 7 (the modification is in boldface italic):

TABLE 6

BWP-Downlink information element

```
-- ASN1START
-- TAG-BWP-DOWNLINK-START
BWP-Downlink ::=                SEQUENCE {
   bwp-Id                       BWP-Id,
   bwp-Common                   BWP-DownlinkCommon
OPTIONAL, -- Cond SetupOtherBWP
   bwp-Dedicated                BWP-DownlinkDedicated
OPTIONAL, -- Need M
   ...,
   [[
   referenceBWPConfig-r16              ReferenceBWPConfig
OPTIONAL -- Need N
]]
}
ReferenceBWPConfig ::=           SEQUENCE {
bwpConfigCommonIndex              BWP-ID          OPTIONAL -- Need R
bwpConfigDedicatedIndex           BWP-ID        OPTIONAL -- Need R
referenceCommonIndicator          ENUMERATED {local, signalling, local+Signalling}
OPTIONAL -- Need S
referenceDedicatedIndicator       ENUMERATED {local, signalling, local+Signalling}
OPTIONAL -- Need S
releaseIndicator                  ENUMERATED {para1, para2, ...}
OPTIONAL -- Need R
}
-- TAG-BWP-DOWNLINK-STOP
-- ASN1STOP
```

TABLE 7

BWP-Uplink information element

```
-- ASN1START
-- TAG-BWP-UPLINK-START
```

TABLE 7-continued

BWP-Uplink information element

```
BWP-Uplink ::=              SEQUENCE {
    bwp-Id              BWP-Id,
    bwp-Common              BWP-UplinkCommon
OPTIONAL, -- Cond SetupOtherBWP
    bwp-Dedicated           BWP-UplinkDedicated
OPTIONAL, -- Need M
    ...,
    [[
    referenceBWPConfig-r16          ReferenceBWPConfig
OPTIONAL -- Need N
    ]]
}
ReferenceBWPConfig ::=          SEQUENCE {
bwpConfigCommonIndex            BWP-ID OPTIONAL -- Need R
bwpConfigDedicatedIndex         BWP-ID OPTIONAL -- Need R
referenceCommonIndicator        ENUMERATED {local, signalling, local+Signalling}
OPTIONAL -- Need S
referenceDedicatedIndicator     ENUMERATED {local, signalling, local+Signalling}
OPTIONAL -- Need S
releaseIndicator        ENUMERATED {para1, para2, ...}
OPTIONAL -- Need R
}
-- TAG-BWP-UPLINK-STOP
-- ASN1STOP
```

Implementation for Solution 6

The ASN.1 example is similar with that for Solution 4.

Additional features and embodiments the above-described methods/techniques discussed above are described below using a clause-based description format.

1. A wireless communication method including: signaling, by a network device, a cell configuration information including a first cell configuration for a first cell, a reference configuration information, and a reference identification (ID) for establishing a logical link between the first cell and the reference configuration information, and wherein the signaling is used to configure the first cell based on the first cell configuration for the first cell and the reference configuration information.

2. The wireless communication method of clause 1, wherein the reference configuration information includes a second cell configuration for a second cell or a common parameter group.

3. The wireless communication method of clause 1, wherein the reference ID includes a cell ID or a common parameter group ID.

4. The wireless communication method of clause 1, wherein the cell configuration information further includes a reference indicator indicating whether the reference configuration information is included in a user device or in the signaling or in both the user device and the signaling, or a release parameter indicator identifying a parameter not being used to configure the first cell.

5. The wireless communication method of clause 1, wherein the reference configuration information is included in a user device or in the signaling or in both the user device and the signaling.

6. The wireless communication method of clause 5, further including notifying the first cell to refer to the reference configuration information included in the user device or in the signaling.

7. The wireless communication method of clause 1, wherein the reference configuration information includes a parameter not used to configure the first cell.

8. The wireless communication method of clause 7, further including adding a reference indicator in the reference configuration to instruct a user device to release the parameters.

9. The wireless communication method of clause 1, further including defining a reference rule among multiple cells including the first cell, the second cell, and a third cell, the reference rule allows the first cell to refer to a cell configuration of the second cell after performing the cell configuration of the second cell by referencing a cell configuration of the third cell.

10. The wireless communication method of clause 1, further including defining a reference rule among the first cell and multiple common parameter groups including the first common parameter group, the second common parameter group, the reference rule allows the first cell to refer to a cell configuration of the first common parameter group after performing the cell configuration by referencing a cell configuration of the second common parameter group.

11. The wireless communication method of clause 1, wherein, in an NR (New Radio) cell group, the first cell is one of secondary cells (SCells) and the second cell is a special cell (SpCell) or another secondary cell (SCell), or the first cell is the special cell and the second cell is one of the second cells or the special cell, considering a MR-DC (Multi-Radio Dual Connectivity).

12. The wireless communication method of clause 1, wherein, in an NR system, each of the first cell and the second cell is a special cell or a secondary cell of a master cell group or a secondary cell group, considering a NR-DC (NR-NR Dual Connectivity).

13. The wireless communication method of clause 1, wherein the cell configuration information further includes an additional reference configuration information, and an additional reference ID for establishing a logical link between the first cell and additional reference configuration information.

14. The wireless communication method of clause 13, wherein the cell configuration information further includes an additional reference indicator indicating whether the reference configuration information is included in a user device or in the signaling or in both the user device and the signaling.

15. The wireless communication method of clause 13, wherein one of the reference configuration information and the additional reference configuration information is used to configure a common configuration structure of the first cell, and the other of the reference configuration information and the additional reference configuration information is used to configure a dedicated configuration structure of the first cell.

16. A wireless communication method including: receiving a signaling including a cell configuration information including a first cell configuration for a first cell, a reference configuration information, and a reference identification (ID) for establishing a logical link between the first cell and the reference configuration information; and configuring the first cell based on the first cell configuration for the first cell and the reference configuration information.

17. The wireless communication method of clause 16, wherein the reference configuration information includes a second cell configuration for a second cell or an individual common parameter group.

18. The wireless communication method of clause 16, wherein the reference ID includes a cell ID or a parameter group ID.

19. The wireless communication method of clause 16, wherein the cell configuration information further includes a reference indicator indicating whether the reference configuration information is included in a user device or in the signaling or in both the user device and the signaling, or a release parameter indicator identifying a parameter not being used to configure the first cell.

20. The wireless communication method of clause 16, wherein the configuring of the first cell includes copying a configuration parameter included in the reference configuration information to the first cell.

21. The wireless communication method of clause 16, wherein the configuring of the first cell includes overriding a configuration parameter in the first cell by using a configuration parameter included in the first cell configuration, thereby configuring the first cell to have a configuration different from the reference configuration information.

22. The wireless communication method of clause 16, wherein the configuring of the first cell includes adding a configuration parameter included in the first cell configuration to the first cell, the added configuration parameter not included in the reference configuration information.

23. The wireless communication method of clause 16, wherein the configuring of the first cell includes releasing a configuration parameter not used to configure the first cell but included in the reference configuration information.

24. The wireless communication method of clause 16, wherein the cell configuration information further includes an additional reference configuration information, and an additional reference ID for establishing a logical link between the first cell and additional reference configuration information.

25. The wireless communication method of clause 24, wherein the cell configuration information further includes an additional reference indicator indicating whether the reference configuration information is included in a user device or in the signaling or in both the user device and the signaling.

26. The wireless communication method of clause 16, wherein the configuring the first cell further includes combining the additional reference configuration information with the first cell configuration for the first cell and the reference configuration information.

27. A wireless communication method including: signaling, by a network device, a BWP configuration information including a first BWP configuration for a first BWP, a reference configuration information, and a reference identification (ID) for establishing a logical link between the first BWP and the reference configuration information, wherein the signaling is used to configure the first BWP based on the first BWP configuration for the first BWP and the reference configuration information.

28. The wireless communication method of clause 27, wherein the reference configuration information includes a second BWP configuration for a second BWP or an individual common parameter group.

29. The wireless communication method of clause 27, wherein the reference ID includes a BWP ID or a parameter group ID.

30. The wireless communication method of clause 27, wherein the BWP configuration information further includes a reference indicator indicating whether the reference configuration information is included in a user device or in the signaling or in both the user device and the signaling, or a release parameter indicator identifying a parameter not being used to configure the first BWP.

31. The wireless communication method of clause 27, wherein both of the first and second BWPs are downlink BWPs, or both of the first and second BWPs are uplink BWPs.

32. The wireless communication method of clause 27, wherein the BWP configuration information further includes an additional reference configuration information, and an additional reference ID for establishing a logical link between the first BWP and the additional reference configuration information.

33. The wireless communication method of clause 32, wherein the BWP configuration information further includes an additional reference indicator indicating whether the reference configuration information is included in a user device or in the signaling or in both the user device and the signaling.

34. The wireless communication method of clause 32, wherein one of the reference configuration information and the additional reference configuration information is used to configure a common configuration structure of the first BWP, and the other of the reference configuration information and the additional reference configuration information is used to configure a dedicated configuration structure of the first BWP.

35. A wireless communication method including: receiving a signaling including a BWP configuration information including a first BWP configuration for a first BWP, a reference configuration information, and a reference identification (ID) for establishing a logical link between the first BWP and the reference configuration information; and configuring the first BWP based on the first BWP configuration for the first BWP and the reference configuration information.

36. The wireless communication method of clause 35, wherein the reference configuration information includes a second BWP configuration for a second BWP or an individual common parameter group.

37. The wireless communication method of clause 35, wherein the reference ID includes a BWP ID or a parameter group ID.

38. The wireless communication method of clause 35, wherein the BWP configuration information further includes a reference indicator indicating whether the reference configuration information is included in a user device or in the signaling or in both the user device and the signaling, or a release parameter indicator identifying a parameter not being used to configure the first BWP.

39. The wireless communication method of clause 35, wherein the configuring of the first BWP includes copying a configuration parameter included in the reference configuration information to the first BWP.

40. The wireless communication method of clause 35, wherein the configuring of the first BWP includes overriding a configuration parameter in the first BWP by using a configuration parameter included in the first BWP configuration, thereby configuring the first BWP to have a configuration different from the reference configuration information.

41. The wireless communication method of clause 35, wherein the configuring of the first BWP includes adding a configuration parameter included in the first BWP configuration to the first BWP, the added configuration parameter not included in the reference configuration information.

42. The wireless communication method of clause 35, wherein the configuring of the first BWP includes releasing a configuration parameter not used to configure the first BWP but included in the reference configuration information.

43. The wireless communication method of clause 35, wherein the BWP configuration information further includes an additional reference configuration information, and an additional reference ID for establishing a logical link between the first BWP and additional reference configuration information.

44. The wireless communication method of clause 43, wherein the BWP configuration information further includes an additional reference indicator indicating whether the reference configuration information is included in a user device or in the signaling or in both the user device and the signaling.

45. The wireless communication method of clause 35, wherein the configuring the first BWP further includes combining the additional reference configuration information with the first BWP configuration for the first BWP and the reference configuration information.

46. A wireless communications apparatus comprising a processor and a memory, wherein the processor is configured to read code from the memory and implement a method recited in any of clauses 1 to 45.

47. A computer program product comprising a computer-readable program medium code stored thereupon, the code, when executed by a processor, causing the processor to implement a method recited in any of clauses 1 to 45.

It will be appreciated that various techniques are described to allow communication apparatus embodiments to perform wireless communication in which signaling overhead for cell group level communication is reduced compared to current techniques. It will further be appreciated that signaling methods implemented by a network device are disclosed. The network device may be implemented in a base station or another device in a wireless communication network such as an operator managed server. It will further be appreciated that a communication apparatus such as a user device may implement signal receiving technique described herein. The user device may include a wireless device such as a smartphone, a tablet, a laptop, a smartwatch, an Internet of Things (IoT) device, an autonomous vehicle, etc.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method including:
signaling, by a network device, a configuration information to configure a first cell or a first BWP,
wherein the configuration information includes 1) a reference configuration information comprising a reference ID for establishing a logical link between the first cell or the first BWP and a reference configuration to allow the first cell or the first BWP to be configured by copying the reference configuration, and 2) a delta configuration information to configure the first cell or the first BWP together with the reference configuration, the delta configuration information including a configuration parameter to be added or overridden to the reference configuration.

2. The wireless communication method of claim 1, wherein the reference configuration includes at least one of a configuration for a second BWP or a second cell, or a common parameter group.

3. The wireless communication method of claim 1, wherein the reference ID includes a BWP ID or a parameter group ID or a cell ID.

4. The wireless communication method of claim 1, wherein the configuration information further includes at least one of a reference indicator indicating whether the reference configuration information is included in a user device or in the signaling or in both the user device and the signaling, or a first release parameter indicator identifying a first parameter not being used to configure the first BWP or the first cell.

5. The wireless communication method of claim 1, wherein the configuration information further includes at least one of an additional reference configuration information, or an additional reference ID for establishing a logical link between the first BWP or the first cell and the additional reference configuration information.

6. The wireless communication method of claim 5, wherein one of the reference configuration information and the additional reference configuration information is used to configure a common configuration structure of the first BWP or the first cell, and the other of the reference configuration information and the additional reference configuration information is used to configure a dedicated configuration structure of the first BWP or the first cell.

7. The wireless communication method of claim 2, further including 1) defining a reference rule among multiple cells or BWPs including the first cell or the first BWP, a second cell or the second BWP, and a third cell or a third BWP, the reference rule allows the first cell or the first BWP to refer to a cell configuration of the second cell or the second BWP after performing a cell configuration of the second cell or a BWP configuration of the second BWP by referencing a cell configuration of the third cell or a BWP configuration of the third BWP or 2) defining a reference rule among the first cell or the first BWP and multiple common parameter groups including a first common parameter group, a second common parameter group, the reference rule allows the first cell or the first BWP to refer to a cell configuration or a BWP configuration of the first common parameter group after performing the cell configuration or the BWP configuration by referencing a cell configuration or a BWP configuration of the second common parameter group.

8. A wireless communication method including:
receiving, by a user device from a network device, a signaling including a configuration information to configure a first cell or a first BWP, wherein the configuration information includes 1) a reference configuration information comprising a reference identification (ID) for establishing a logical link between the first cell and a reference configuration to allow the first BWP or the first cell to be configured by copying the reference configuration, and 2) a delta configuration information to configure the first cell or the first BWP together with the reference configuration, the delta configuration information including a configuration parameter to be added or overridden to the reference configuration, and
configuring the first cell or the first BWP based on the configuration information.

9. The wireless communication method of claim 8, wherein the reference configuration includes at least one of a configuration for a second cell or a second BWP, or a common parameter group and the reference ID includes a cell ID, a BWP ID, or a parameter group ID.

10. The wireless communication method of claim 8, wherein the configuration information further includes an additional reference configuration information, and an additional reference ID for establishing a logical link between the first cell or the first BWP and the additional reference configuration information.

11. The wireless communication method of claim 8, wherein the configuring of the first cell or the first BWP includes at least one of 1) copying a configuration parameter included in the reference configuration information to the first cell or the first BWP, 2) overriding a configuration parameter in the first cell or the first BWP by using a configuration parameter included in the configuration information, thereby configuring the first cell or the first BWP to have a configuration different from the reference configuration information, 3) adding the configuration parameter included in the configuration information to the first cell or the first BWP, the added configuration parameter not included in the reference configuration information, or 4) releasing a configuration parameter not used to configure the first cell or the first BWP but included in the reference configuration information.

12. The wireless communication method of claim 10, wherein the configuring of the first cell or the first BWP includes combining the additional reference configuration information with a configuration for the first cell and the reference configuration information.

13. An apparatus for wireless communication comprising a processor that is configured to carry out a method comprising:
signaling, by a network device, a configuration information to configure a first cell or a first BWP,
wherein the configuration information includes 1) a reference configuration information comprising a reference ID for establishing a logical link between the first cell or the first BWP and a reference configuration to allow the first cell or the first BWP to be configured by copying the reference configuration, and 2) a delta configuration information to configure the first cell or the first BWP together with the reference configuration, the delta configuration information including a configuration parameter to be added or overridden to the reference configuration.

14. The apparatus of claim 13, wherein the reference configuration includes at least one of a configuration for a second BWP or a second cell, or a common parameter group.

15. The apparatus of claim 13, wherein the reference ID includes a BWP ID or a parameter group ID or a cell ID.

16. The apparatus of claim 13, wherein the configuration information further includes at least one of a reference indicator indicating whether the reference configuration information is included in a user device or in the signaling or in both the user device and the signaling, or a first release parameter indicator identifying a first parameter not being used to configure the first BWP or the first cell.

17. The apparatus of claim 13, wherein the configuration information further includes at least one of an additional reference configuration information, or an additional reference ID for establishing a logical link between the first BWP or the first cell and the additional reference configuration information.

18. The apparatus of claim 17, wherein one of the reference configuration information and the additional reference configuration information is used to configure a common configuration structure of the first BWP or the first cell, and the other of the reference configuration information and the additional reference configuration information is used to configure a dedicated configuration structure of the first BWP or the first cell.

19. The apparatus of claim 14, further including 1) defining a reference rule among multiple cells or BWPs including the first cell or the first BWP, a second cell or the second BWP, and a third cell or a third BWP, the reference rule allows the first cell or the first BWP to refer to a cell configuration of the second cell or the second BWP after performing a cell configuration of the second cell or a BWP configuration of the second BWP by referencing a cell configuration of the third cell or a BWP configuration of the third BWP or 2) defining a reference rule among the first cell or the first BWP and multiple common parameter groups including a first common parameter group, a second common parameter group, the reference rule allows the first cell or the first BWP to refer to a cell configuration or a BWP configuration of the first common parameter group after performing the cell configuration or the BWP configuration by referencing a cell configuration or a BWP configuration of the second common parameter group.

* * * * *